US010023166B2

(12) United States Patent
Takeda et al.

(10) Patent No.: US 10,023,166 B2
(45) Date of Patent: Jul. 17, 2018

(54) BRAKE CONTROL DEVICE

(71) Applicant: HITACHI AUTOMOTIVE SYSTEMS, LTD., Ibaraki (JP)

(72) Inventors: Hiroki Takeda, Yokohama (JP); Tohma Yamaguchi, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 7 days.

(21) Appl. No.: 15/511,486

(22) PCT Filed: Feb. 22, 2016

(86) PCT No.: PCT/JP2016/055069
§ 371 (c)(1),
(2) Date: Mar. 15, 2017

(87) PCT Pub. No.: WO2016/136671
PCT Pub. Date: Sep. 1, 2016

(65) Prior Publication Data
US 2017/0297546 A1 Oct. 19, 2017

(30) Foreign Application Priority Data
Feb. 27, 2015 (JP) ................................. 2015-039473

(51) Int. Cl.
*B60T 8/44* (2006.01)
*B60T 13/66* (2006.01)
(Continued)

(52) U.S. Cl.
CPC ............ *B60T 13/662* (2013.01); *B60T 7/042* (2013.01); *B60T 8/171* (2013.01); *B60T 13/686* (2013.01);
(Continued)

(58) Field of Classification Search
CPC ... B60T 7/042; B60T 8/17; B60T 8/96; B60T 8/321; B60T 8/442; B60T 13/745
(Continued)

(56) References Cited

U.S. PATENT DOCUMENTS

2009/0039702 A1* 2/2009 Nishino ................... B60T 7/042
303/114.1
2009/0045672 A1* 2/2009 Nishino ................... B60T 7/042
303/113.3

(Continued)

FOREIGN PATENT DOCUMENTS

JP 2001-513041 8/2001
JP 2009-40290 2/2009

(Continued)

OTHER PUBLICATIONS

International Search Report dated May 10, 2016 in International Application No. PCT/JP2016/055069.

*Primary Examiner* — Christopher P Schwartz
(74) *Attorney, Agent, or Firm* — Wenderoth, Lind & Ponack, L.L.P.

(57) ABSTRACT

A brake control device capable of preventing a braking force from being excessive when information cannot be transmitted between a first control unit configured to control operation of a boost mechanism and a second control unit configured to control operation of a hydraulic control mechanism. When a second ECU (32) cannot transmit information to a first ECU (26) due to a disconnection of a signal line (27), the second ECU carries out backup control of detecting a braking operation amount of a driver based on signal input from hydraulic pressure sensors (29), and operating a hydraulic pressure supply device (30) based on the detected braking operation amount, to thereby pressurize insides of wheel cylinders. In this case, the second ECU decreases a pressurization amount of a pressure inside the (Continued)

wheel cylinders when a pressure of a master cylinder (8) exceeds a predetermined value (PM0) during the backup control.

9 Claims, 8 Drawing Sheets

(51) Int. Cl.
    *B60T 13/74*      (2006.01)
    *B60T 13/68*      (2006.01)
    *B60T 8/171*      (2006.01)
    *B60T 7/04*      (2006.01)

(52) U.S. Cl.
    CPC ....... *B60T 13/745* (2013.01); *B60T 2270/402* (2013.01)

(58) Field of Classification Search
    USPC .................................. 303/114.1; 701/70–72
    See application file for complete search history.

(56) References Cited

U.S. PATENT DOCUMENTS

| | | | |
|---|---|---|---|
| 2009/0236903 A1* | 9/2009 | Nishino | B60T 8/442 303/3 |
| 2011/0077831 A1* | 3/2011 | Nishino | B60T 7/042 701/70 |
| 2011/0316329 A1* | 12/2011 | Nishino | B60T 7/042 303/14 |
| 2013/0082514 A1* | 4/2013 | Murakami | B60T 13/686 303/14 |
| 2014/0095044 A1* | 4/2014 | Kikawa | B60T 17/221 701/70 |
| 2014/0257658 A1* | 9/2014 | Shimizu | B60T 8/17 701/70 |
| 2018/0105156 A1* | 4/2018 | Kishi | B60T 13/662 |

FOREIGN PATENT DOCUMENTS

| | | |
|---|---|---|
| JP | 2010-18193 | 1/2010 |
| JP | 2014-169039 | 9/2014 |
| WO | 98/35867 | 8/1998 |

* cited by examiner

BRAKE CONTROL DEVICE

TECHNICAL FIELD

The present invention relates to a brake: control device for applying a braking force to a vehicle.

BACKGROUND ART

A brake control, device installed in a vehicle, for example, a motor vehicle, includes a boost mechanism (first boost mechanism) capable of increasing a pressure inside wheel cylinders by operating a master cylinder though use of an electric actuator, and a hydraulic pressure control mechanism (second boost mechanism) provided between the master cylinder and the wheel cylinders and capable of increasing the pressure inside the wheel cylinders (Patent Literature 1). In a case where the boost mechanism cannot pressurize the insides of the wheel cylinders when a driver operates a brake pedal, the brake control device disclosed in Patent Literature 1 carries out backup control of pressurizing the insides of the wheel cylinders through use of the hydraulic pressure control mechanism to.

CITATION LIST

Patent Literature

PTL 1: JP 2010-18193 A

SUMMARY OF INVENTION

Technical Problem

Incidentally, when communication between the boost mechanism and the hydraulic pressure control mechanism is interrupted by, for example, disconnection of a communication line, it is considered that the brake control device disclosed in Patent Literature 1 determines that the insides of the wheel cylinders cannot be pressurized by the boost mechanism, and the backup control is carried cut by the hydraulic pressure control mechanism. On this occasion, when the boost mechanism is normally operating, both the boost mechanism and the hydraulic pressure control mechanism pressurize the insides of the wheel cylinders, which may cause an excessive braking force.

The present invention has been made in view of the above-mentioned problem, and therefore has an object to provide a brake control device capable of preventing a braking force from being excessive when information cannot be transmitted between a first control unit configured to control operation of a boost mechanism and a second control unit configured to control operation of a hydraulic pressure control mechanise.

Solution to Problem

In order to solve the above-mentioned problem, according to one embodiment of the present invention, there is provided a brake control device, including: a master cylinder to be operated by a braking operation of a driver; a boost mechanise capable of increasing a pressure inside a wheel cylinder by operating the master cylinder in accordance with a braking operation amount of the driver; a first control unit configured to control operation of the boost mechanism so as to pressurize the master cylinder in accordance with a detection value of a stroke sensor configured to detect the braking operation amount of the driver; a master cylinder pressure sensor configured to detect a pressure of the master cylinder; a hydraulic pressure control mechanism provided independently of the boost mechanism and comprising a hydraulic pressure source capable of increasing the pressure inside the wheel cylinder; a second control unit to which the master cylinder pressure sensor is connected, and which is configured to control operation of the hydraulic pressure control mechanism; and a communication line configured to connect the first control unit and the second control unit to each other for bi-directional transmission of information, in which: the second control unit includes a backup control mechanism configured to detect, when the second control unit is incapable of transmitting the information to the first control unit, the braking operation amount of the driver based on signal input from the master cylinder pressure sensor, and to operate the hydraulic pressure control mechanism based on the detected braking operation amount, to thereby pressurize the inside of the wheel cylinder; and the second control unit is configured to decrease a pressurization amount of the pressure inside the wheel, cylinder when a value based on the pressure of the master, cylinder exceeds a predetermined value during backup control by the backup control mechanism.

Advantageous Effect of Invention

According to the present invention, it is possible to prevent the braking force from being excessive when the information cannot be transmitted between the first control unit configured to control the operation of the boost mechanism and the second control unit configured to control the operation of the hydraulic pressure control mechanism.

DESCRIPTION OF EMBODIMENTS

Referring to the accompanying drawings, a detailed description is now given of a brake control device according to embodiments of the present invention while exemplifying a case where the brake control device is installed in a four-wheel motor vehicle. The letter "S" is used for each step of flowcharts illustrated in FIG. 5 and FIG. 9. For example, Step 1 is denoted by "S1".

Figure 1:
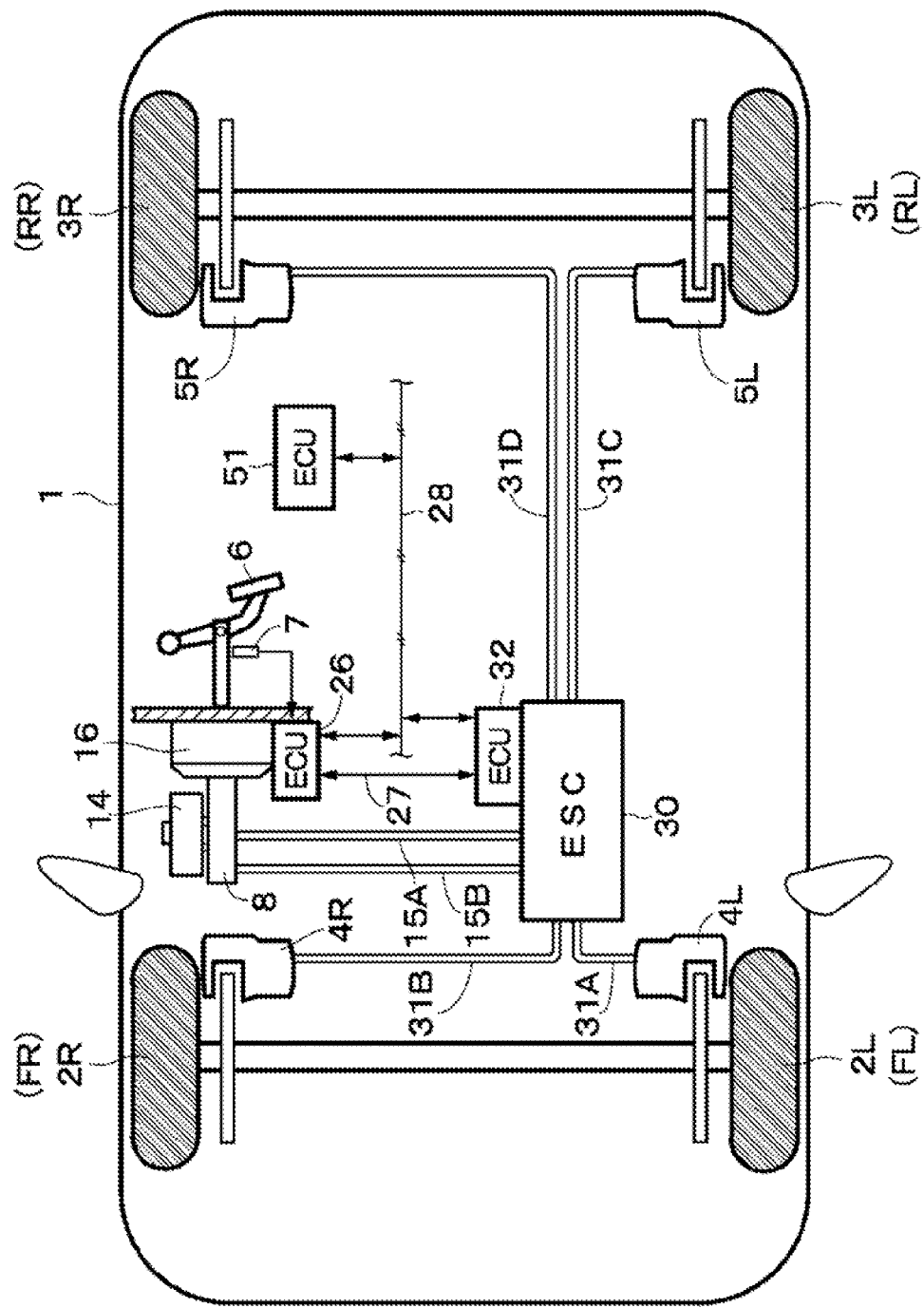
FIG. 1 is a schematic diagram for illustrating a vehicle in which a brake control device according to an embodiment of the present invention is installed.

FIG. 1 to FIG. 8 are illustrations of a first embodiment of the present invention. In FIG. 1, a total of four wheels constructed by front left and right wheels 2L and 2R, and rear left and right wheels 3L and 3R are provided on a bottom side (a road surface side) of a vehicle body 1 constructing a body of the vehicle. Front-wheel-side wheel cylinders 4L and 4R are provided respectively for the front left and right wheels 2L and 2R. Rear-wheel-side wheel cylinders 5L and 5R are provided respectively for the rear left and right wheels 3L and 3R. Those wheel cylinders 4L, 4R, 5L, and 5R construct cylinders of hydraulic disc brakes or drum brakes, and are configured to apply braking forces to the respective wheels, that is, the front left and right wheels 2L and 2R, and the rear left and right wheels 3L and 3R.

According to this embodiment, a braking force generation system, which is a mechanism configured to generate the braking force, is constructed by an electric booster 15 and a hydraulic pressure supply device (ESC) 30. The electric booster 16 is controlled by a first ECU 26, and the hydraulic pressure supply device 30 is controlled by a second ECU 32. Both of those ECUs 26 and 32 are configured to be able to mutually transmit information owned by the ECUs 26 and 32 via a signal line 27, and to share roles so as to determine which of the electric booster 16 and the hydraulic pressure supply device 30 generates the braking forces in accordance with a vehicle state and a state of the braking force generation system.

The brake pedal 6 is provided on a front board side of the vehicle body. When the electric booster 16 is normal, and a braking request of a driver is input by the brake pedal 6, the electric booster 16 drives an electric motor 21 (FIG. 2) of the electric booster 16, thereby generating a hydraulic pressure from the master cylinder 8, and brake fluid is supplied to the wheel cylinders 4L, 4R, 5L, and 5R via the hydraulic pressure supply device 30. As a result, the braking forces are generated.

On the other hand, when abnormality occurs in the electric booster 16, and a braking request of the driver is input by the brake pedal 6, the hydraulic pressure from the master cylinder 8 generated by the input is detected by hydraulic pressure sensors 29 (FIG. 2) connected to the second ECU 32 of the hydraulic pressure supply device 30, and an electric motor 45 (FIG. 2) of the hydraulic pressure supply device 30 is driven. As a result, the brake fluid is supplied to the wheel cylinder's 4L, 4R, 5L, and 5R, thereby generating the braking forces.

Figure 2:
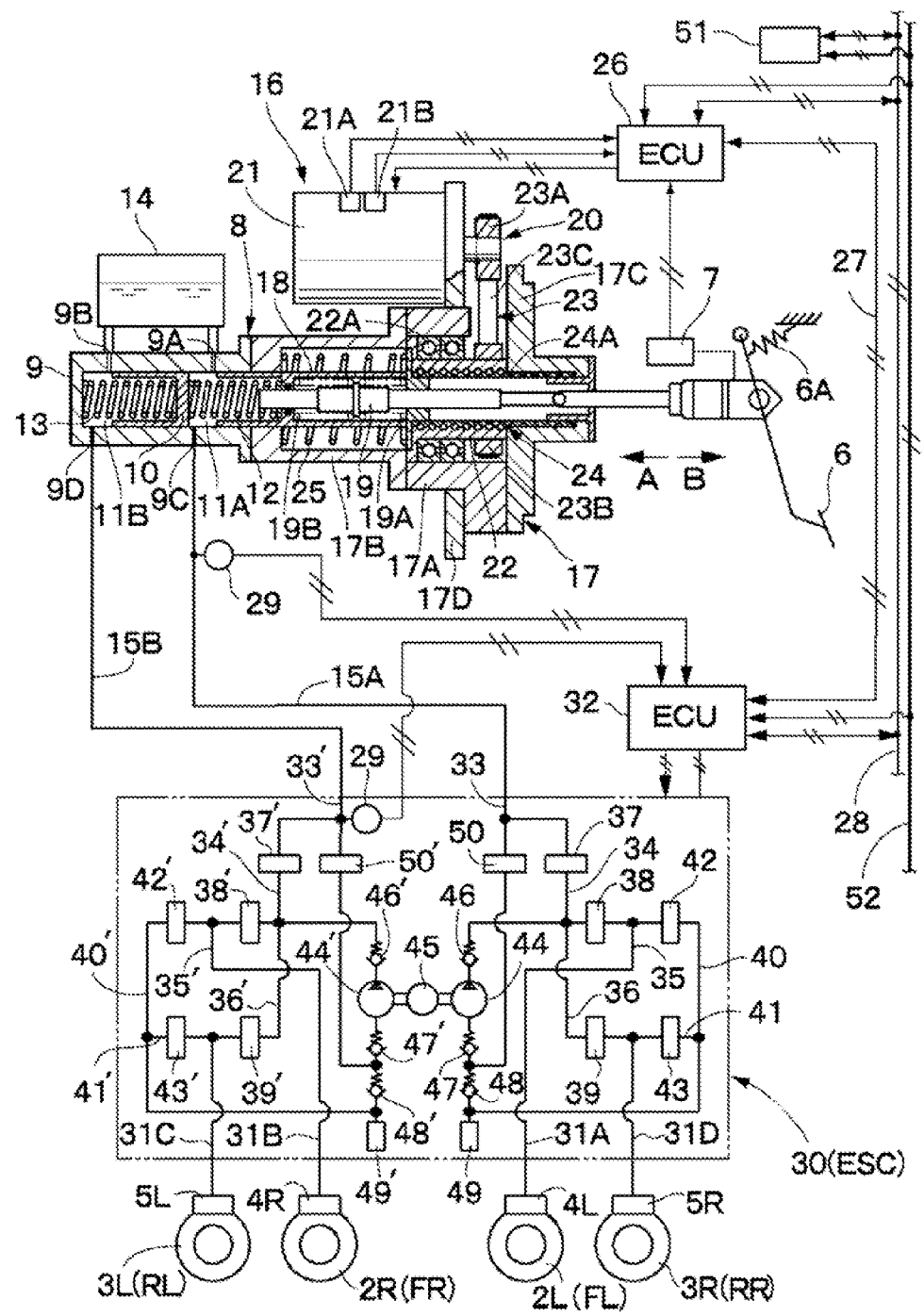
FIG. 2 is an overall configuration diagram for illustrating the brake control device according to the embodiment.

Referring to FIG. 2 in addition to FIG. 1, a description is now given of a specific configuration of the brake control device according to this embodiment.

As illustrated in FIG. 2, the brake pedal 6 is operated so as to be depressed in a direction indicated by an arrow A by the driver when the brake of the vehicle is operated. A pedal return spring 6A is provided on the brake pedal 6. The pedal return spring 6A is configured to apply a spring force to the brake pedal 6 toward a direction indicated by an arrow B of FIG. 1, thereby biasing the brake pedal 6 toward an initial position. In other words, the brake pedal 6 is coupled to an input rod 19 described later, and the input rod 19 returns to an initial position of the pedal return spring 6A when there is no operation by the driver.

Moreover, an operation amount detector 7 configured to detect the braking operation amount of the driver is provided on the brake pedal 6 (more specifically, the input rod 19). The operation amount detector 7 is constructed by, for example, a stroke sensor configured to detect a stroke amount (pedal stroke) of the brake pedal 6. The operation amount detector 7 only needs to be able to detect at least a position of the brake pedal 6 (position of the input rod 19 described later) or a change amount (stroke amount) of the brake pedal which is a depression operation amount thereof.

The operation amount detector 7 may be an operation amount detector including a plurality of position sensors including a displacement sensor for the input rod 19 and a force sensor configured to detect a depression force on the brake pedal 6 by the driver. The operation amount detector 7 is configured to output a detection signal thereof to the ECUs 26 and 32 described later, a vehicle data bus 28, and the like. When the depression operation is applied to the brake pedal 6, a brake hydraulic pressure is generated in the master cylinder 8 via the electric booster 16 described later.

A description is now given of the master cylinder 8 configured to generate a master cylinder pressure (M/C pressure).

The master cylinder 8 is operated by the braking operation of the driver. The master cylinder 8 is constructed by a tandem-type master cylinder, and includes a cylinder main body 9 having an open end on one end side and a closed bottom portion on another end side, that is, having a bottomed cylindrical shape. First and second reservoir ports 9A and 9B connected to a reservoir 14 described later are provided on the cylinder main body 9. The first reservoir port 9A communicates to or disconnects from a first hydraulic chamber 11A due to slide displacement of a booster piston 18 described later. On the other hand, the second reservoir port 9B communicates to or disconnects from a second hydraulic chamber 11B due to a second piston 10 described later.

Further, first and second supply ports 9C and 9D connected to the wheel cylinders 4L, 4R, 5L, and 5R are provided on the cylinder main body 9. The first supply port 9C serving as a primary port is connected to, for example, the front-left-wheel-side wheel cylinder 4L and the rear-right-wheel-side wheel cylinder 5R. The second supply port 9D serving as a secondary port is connected to, for example, the front-right-wheel-side wheel cylinder 4R and the rear-left-wheel-side wheel cylinder 5L.

The open end side of the cylinder main body 3 is fixed in a detachable manner to a booster housing 17 of the electric booster 16 described later through use of, for example, a plurality of mounting bolts (not shown). The master cylinder 8 is constructed by the cylinder main body 9, a first piston (the booster piston 18 and the input rod 13 described later), the second piston 10, the first hydraulic chamber 11A, the second hydraulic chamber 11B, a first return spring 12, and a second return spring 13.

In this case, in the master cylinder 8, the first piston serving as a primary piston (namely, P piston) is constructed by the booster piston 18 and the input rod 13 described later. The first hydraulic chamber 11A formed in the cylinder main body 9 is defined between the second piston 10 serving as a secondary piston and the booster piston 18 (and the input rod 19). The second hydraulic chamber 11B is defined in the cylinder main body 9 between the bottom portion of the cylinder main body 9 and the second piston 10.

The first return spring 12 is positioned in the first hydraulic chamber 11A and arranged between the booster piston 18 and the second piston 10, and is configured to bias the booster piston 18 toward the open end side of the cylinder main body 9. The second return spring 13 is positioned in the second hydraulic chamber 11B and arranged between the bottom portion of the cylinder main body 9 and the second piston 10, and is configured to bias the second piston 10 toward the first hydraulic chamber 11A side.

When the depression operation is carried out on the brake pedal 6, the booster piston 18 (and the input rod 19) and the second piston 10 are displaced toward the bottom portion of the cylinder main body 9 in the cylinder main body 9 of the master cylinder 8. On this occasion, when the first and second reservoir ports 9A and 9B are disconnected toy the booster piston 18 and the second piston 10, the brake fluid in the first and second hydraulic chambers 11A and 11B generates the brake hydraulic pressure (M/C pressure) form the master cylinder 8. On the other hand, when the operation on the brake pedal 6 is released, the booster piston 18 (and the input rod 19) and the second piston 10 are displaced toward the open portion of the cylinder main body 9 in the direction indicated by the arrow B by the first and second return springs 12 and 13. On this occasion, the master cylinder 8 releases the hydraulic pressure in the first and second hydraulic chambers 11A and 11B while being supplied with the brake fluid from the reservoir 14.

The reservoir 14 serving as a working fluid tank configured to score the brake fluid therein, is provided in the cylinder main body 9 of the master cylinder 8. The reservoir 14 is configured to supply/discharge the brake fluid to/from the hydraulic champers 11A and 11B inside the cylinder main body 9. In other words, while the first reservoir port 9A is caused to communicate to the first hydraulic chamber 11A by the booster piston 18, and the second reservoir port 9B is caused to communicate to the second hydraulic chamber 11B by the second piston 10, the brake fluid in the reservoir 14 is supplied/discharged to/from the insides of the hydraulic chambers 11A and 11B.

On the other hand, when the first reservoir port 9A is disconnected from the first hydraulic chamber 11A by the booster piston 18, and the second reservoir port 9B is disconnected from the second hydraulic chamber 11B by the second piston 18, the supply/discharge of the brake fluid in the reservoir 14 to/from the hydraulic chambers 11A and 11B is disconnected. Therefore, the brake hydraulic pressure (M/C pressure) is generated by the braking operation in the first and second hydraulic chambers 11A and 11B of the master cylinder 6, and this brake hydraulic pressure is fed to the hydraulic pressure supply device 30 (namely, the ESC 30), for example, via a pair of cylinder-side hydraulic pressure pipes 15A and 15B.

A description is now given of the electric booster 16 serving as a boost mechanism capable of operating the master cylinder 8 in accordance with the braking operation amount of the driver, thereby increasing the pressure inside the wheel cylinders 4L, 4R, 5L, and 5R.

The electric booster 16 serving as a booster configured to increase an operation force of the brake pedal 6 is provided between the brake pedal 6 and the master cylinder 8 of the vehicle. The electric booster 16 is configured to drive (an electric motor 21 of) an electric actuator 20 described later based on a command from the first ECU 26 in accordance with the output of the operation amount detector 7, to thereby variably control the brake hydraulic pressure generated in the master cylinder 8.

The electric booster 16 is constructed by the booster housing 17 provided so as to be fixed to a cabin front wall, which is the dashboard of the vehicle body, the booster piston 18 serving as a piston movable relatively to the input rod 19 described later, and provided so as to move in the booster housing 17, and the electric actuator 20 serving as an actuator configured to move the booster piston 18 forward/backward in an axial direction of the master cylinder 8, thereby applying a booster thrust to the booster piston 18.

The booster piston 18 is constructed by a tubular member inserted and fit into the cylinder main body 9 of the master cylinder 8 from the open end side in a slidable manner in the axial direction. The input rod (input piston) 19 serving as an input member, which is directly pushed to move in accordance with the operation on the brake pedal 6 and move forward/backward in the axial direction (that is, the directions indicated by the arrows A and B) of the master cylinder 8, is inserted and fit into an inner periphery side of the booster piston 18 in a slidable manner. The input rod 19 together with the booster piston 18 constructs the first piston of the master cylinder 8, and the brake pedal 6 is coupled to an end on a rear side (one side in the axial direction) of the input rod 19, The first hydraulic chamber 11A is defined between the second piston 10 and the booster piston 18 (and the input rod 19) in the cylinder main body 9.

The booster housing 17 is constructed by a tubular speed reducer case 17A configured to internally store a speed reduction mechanism 23 described latex and the like, a tubular support case 17B provided between the speed reducer case 17A and the cylinder main body 9 of the master cylinder 8, which is configured to support the booster piston 18 in a manner that allows sliding displacement in the axial direction, and a stepped tubular lid 17C arranged, on an opposite side (one side in the axial direction) in the axial direction to the support case 17B with respect to the speed reducer case 17A, which is configured to close and open on the one side in the axial direction of the speed reducer case 17A. A support plate 17D configured to support, in a fixed manner, the electric motor 21 described later is provided on an outer periphery side of the speed reducer case 17A.

The input rod 19 is inserted into the booster housing 17 from the lid 17C side, and extends in the axial direction inside the booster piston 18 toward the first hydraulic chamber 11A. A pair of neutral springs 19A and 19B are interposed between the booster piston 18 and the input rod 19. The booster piston 18 and the input rod 19 are configured so that the booster piston 18 and the input rod 19 are elastically held at a neutral position by spring forces of the neutral springs 19A and 19B, and spring forces of the neutral springs 19A and 19B act against relative displacements in the axial direction of the booster piston 18 and the input rod 19.

An end surface on a distal end side (opposite side in the axial direction) of the input rod 19 receives a hydraulic pressure as a brake reaction force generated in the first hydraulic chamber 11A during the braking operation, and the input rod 19 transmits the hydraulic pressure to the brake pedal 6. As a result, the driver of the vehicle receives an appropriate depression response corresponding to the braking force via the brake pedal 6, and can sense appropriate pedal feeling (effect of the brake). As a result, operation feeling of the brake pedal 6 can be increased, and the pedal feeling (depression response) can be maintained to be appropriate.

Moreover, the input rod 19 is configured so as to abut against the booster piston 18 when the input rod 19 moves forward by a predetermined amount with respect to the booster piston 18, thereby moving forward the booster piston 18. This configuration enables use of the depression force on the brake pedal 6 to move forward the booster piston 18 when the electric actuator 20 described later or the first ECU 26 fails, thereby generating the hydraulic pressure inside the master cylinder 8.

The electric actuator 20 of the electric booster 16 is constructed by the electric motor 21 provided in the speed reducer case 17A of the booster housing 17 via the support plate 17D, the speed reduction mechanism 23, for example, a belt, which is configured to reduce the speed of the rotation of the electric motor 21 and then transmit the reduced rotation to a tubular rotation body 22 in the speed reducer case 17A, and a linear motion mechanism 24, for example, a ball screw, which is configured to convert the rotation of the tubular rotation body 22 to axial displacement (forward/ backward movement) of the booster piston 18.

The electric motor 21 is constructed by, for example, a DC brushless motor, and a rotation sensor 21A called a resolver and a current sensor 21B configured to detect a motor correct are provided in the electric motor 21. The rotation sensor 21A is configured to detect a rotation position (rotation angle) of the electric motor 21 (motor shaft) to output a detection signal of the rotation position to the first ECU 26. The first ECU 26 is configured to carry out feedback control for the electric motor 21 (that is, the booster piston 18) in accordance with this rotation position signal. Moreover, the rotation sensor 21A has a function as piston position detection means (rotation detection means) for detecting an absolute displacement of the booster piston 18 with respect to the vehicle Cody based on the detected rotation position of the electric motor 21.

On this occasion, the rotation sensor 21A constructs, together with the operation amount detector 7, displacement detection means for detecting relative displacement between the booster piston 18 and the input rod 19, and detection signals of the rotation sensor 21A and the operation amount detector 7 are transmitted to the first ECU 26. The piston position detection means (rotation detection means) is not limited to the rotation sensor 21A, for example, a resolver, and may be constructed by, for example, a potentiometer of a rotation type capable of detecting an absolute displacement (angle).

The speed reduction mechanism 23 is constructed as a belt speed reduction mechanism. The speed reduction mechanism 23 includes a drive pulley 23A mounted to the drive shaft of the electric motor 21, a driven pulley 23B mounted to the tubular rotation body 22, and a belt 23C installed so as to be wound between the drive pulley 23A and the driven pulley 23B. The tubular rotation body 22 is supported in a rotatable manner by the speed reducer case 17A of the booster housing 17 via rolling bearings 22A. The speed reduction mechanism 23 is configured to reduce the speed of the rotation of the output shaft of the electric motor 21 at a predetermined speed reduction ratio, and then transmit the rotation to the tubular rotation body 22.

The linear motion mechanism 24 is constructed as a ball screw mechanism. The linear motion mechanism 24 includes a tubular (hollow) linear motion member 24A provided on an inner periphery side of the tubular rotation body 22 via a plurality of balls in a manner that allows movement in the axial direction, and the input rod 19 is inserted inside the linear motion member 24A. The linear motion member 24A abut against, at a front end, a rear end of the booster piston 18, and are displaced in the axial direction, integrally with the booster piston 18, on the inner periphery side of the lid 17C of the booster housing 17 and the tubular rotation body 22.

The booster piston 18 and the input rod 19 face the first hydraulic chamber 11A of the master cylinder 8 at respective front ends (ends on the another side in the axial direction), and use the depression force (thrust) transmitted from the brake pedal 6 to the input rod 19 and the booster thrust transmitted from the electric actuator 20 to the booster piston 18 to generate the brake hydraulic pressure in the master cylinder 8.

In other words, the booster piston 18 of the electric booster 16 constructs a pump mechanism driven by the electric actuator 20 based on the output (that is, the braking request) of the operation amount detector 7, thereby generating the brake hydraulic pressure (M/C pressure) in the master cylinder 8. Moreover, a return spring 25 configured to constantly bias the booster piston 18 in a braking release direction (the direction indicated by the arrow B of FIG. 1) is provided in the support case 17B of the booster housing 17. The booster piston 18 is configured to return toward the direction indicated by the arrow B to an initial position illustrated in FIG. 2 by a driving force when the electric motor 21 is inversely rotated when the braking operation is released and the biasing force of the return spring 25.

On this occasion, the linear motion mechanism 24 has backdrivability, and can rotate the tubular rotation body 22 by the linear motion of the linear motion member 24A. As illustrated in FIG. 2, when the booster piston 18 moves backward to the return position, the linear motion member 24A abuts against the closed end side of the lid 17C. This closed end functions as a stopper configured to restrict the return position of the booster piston 18 via the linear motion member 24.

The linear motion member 24A abuts against the booster piston 18 from the rear side so that the booster piston 18 may separate from the linear motion member 24A and independently move forward. As a result, when abnormality occurs in the electric booster 16 due to, for example, operation defect caused by, for example, disconnection of the electric motor 21, the linear motion member 24A is returned to the backward movement position by the spring force of the return spring 25. On this occasion, the booster piston 18 can independently move, and hence the booster piston 115 moves together with the linear member 24A toward the backward movement side, thereby suppressing drag of the brake. On the other hand, when the braking force is applied, the hydraulic pressure can be generated based on the forward movement of the input rod 19. On this occasion, when the input rod 19 moves forward by a predetermined amount, the hydraulic pressure can be generated based on the forward movements of both the input rod 19 and the boost piston 18.

The speed reduction mechanism 23 is not limited to the belt or the like, and may be constructed by, for example, a gear speed reduction mechanism. Moreover, the linear motion mechanism 24 configured to convert the rotational motion to the linear motion may be constructed by, for example, a rack-and-pinion mechanism. Further, the speed reduction mechanism 23 does not always need to be provided. For example, a motor shaft may be provided integrally with the tubular rotation body 22, a stator of an electric motor may be arranged, in a periphery of the tubular rotation body 22, and the tubular rotation body 22 may be directly rotated as a rotor by the electric motor.

The first ECU 26 is constructed by, for example, a microcomputer and the like, and is configured to electrically apply drive control to the electric actuator 20 (electric motor 21) of the electric booster 16. In other words, the first ECU 26 serves as a control unit for the electric booster (first control unit for the brake control device) configured, to control the operation of the electric booster 16 in order to pressurize the master cylinder 8 in accordance with the output (detection value) of the operation amount detector 7.

An input side of the first ECU 26 is connected to the operation amount detector 7 configured to detect the operation amount (or the depression force) of the brake pedal. 6, the rotation sensor 21A and the current sensor 21B of the electric motor 21, the in-vehicle signal line 27 called, for example, L-CAN and allowing communication, and a vehicle data bus 28 configured to transmit/receive signals to/from ECUs of other vehicle devices. The signal line 27 serves as a communication line configured to connect the first ECU 26 and the second ECU 32 to each other for bi-directional transmission of information.

The vehicle data bus 28 is a serial communication part called V-CAN installed in the vehicle, and is configured to carry out multiplex communication among a large number of electronic devices installed in the vehicle. Further, electric power is supplied to the first ECU 26 from an in-vehicle battery (not shown) via a power supply line 52 described later. In FIG. 1 and FIG. 2, lines with two slanted lines denote lines in the electric system, for example, signal lines and power supply lines.

The hydraulic pressure sensors 29 construct master cylinder pressure sensors (hydraulic pressure detectors) configured to detect the pressure (brake hydraulic pressure) inside the master cylinder 8. The hydraulic pressure sensors 29 are configured to detect the hydraulic pressure in, for example, the cylinder-side hydraulic pressure pipes 15A and 15B, and detect the brake hydraulic pressure supplied from the master cylinder 8 to the hydraulic pressure supply device 30 described later via the cylinder-side hydraulic pressure pipes 15A and 15B. In other words, the hydraulic pressure sensors 29 are configured to detect the brake hydraulic pressure generated by the master cylinder 8. According to this embodiment, the hydraulic pressure sensors 29 are electrically connected to the second ECU 32 described later, and the detection signals obtained by the hydraulic pressure sensors 29 are transmitted from the second ECU 32 to the first ECU 26 via the signal line 27 through communication.

Figure 3:
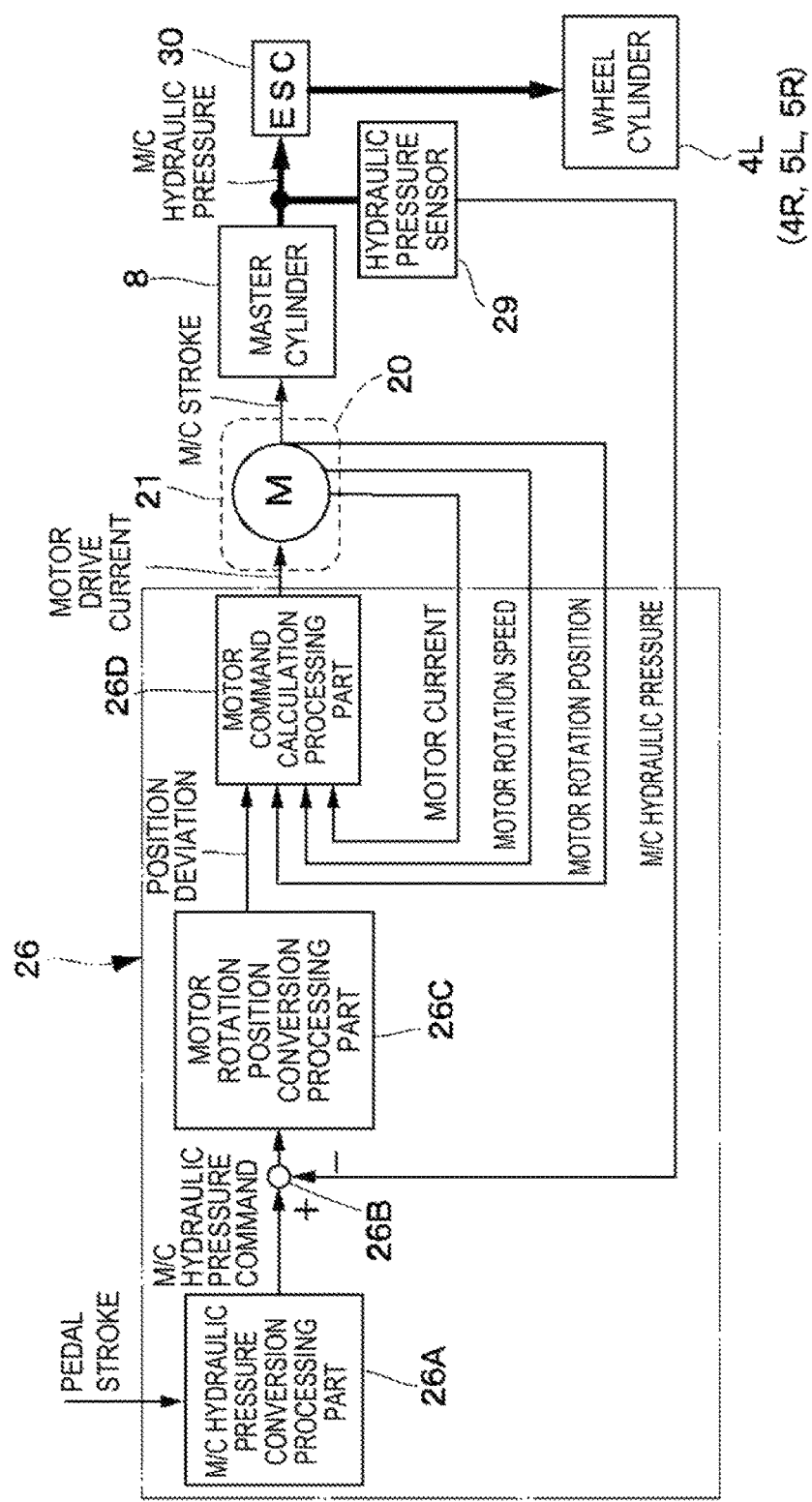
FIG. 3 is a block diagram for illustrating a boost mechanism of the brake control device.

In FIG. 3, one hydraulic pressure sensor 29 is provided in the hydraulic pressure supply device 30, and another hydraulic pressure sensor 29 is provided at a position remote from the hydraulic pressure supply device 30. However, both the hydraulic pressure sensors 29 may be provided inside the hydraulic pressure supply device 30 or at positions remote from the hydraulic pressure supply device 30. Moreover, the hydraulic pressure sensors 29 may be provided in only one of the cylinder-side hydraulic pressure pipes 15A and 15B. Further, the hydraulic pressure sensor 29 may be directly mounted to the cylinder main body 9 of the master cylinder 8 as long as the hydraulic pressure sensor 29 can detect the brake hydraulic pressure inside the master cylinder 8. Moreover, the hydraulic pressure sensors 29 are electrically connected only to the second ECU 32, but may be electrically connected also to the first ECU 26, that is, to the first ECU 26 and the second ECU 32.

On the other hand, an output side of the first ECU 26 is connected to the electric motor 21, the in-vehicle signal line 27, and the vehicle data bus 28. The first ECU 26 has a function of using the electric actuator 20 to variably control the brake hydraulic pressure generated inside the master cylinder 8 in accordance with the detection signals from the operation amount detector 7 and the hydraulic pressure sensors 29, and a function of determining whether or not the electric booster 16 is normally operating, for example.

On this occasion, in the electric booster 16, when the depression operation is carried out on the brake pedal 6, the input rod 19 moves forward toward the inside of the cylinder main body 9 of the master cylinder 8, and the movement at this time is detected by the operation amount detector 7. The first ECU 26 outputs an activation command to the electric motor 21 in accordance with the detection signal from the operation amount detector 7, thereby rotationally driving the electric motor 21. The rotation of the electric motor 21 is transmitted to the tubular rotation body 22 via the speed reduction mechanism 23, and the rotation of the tubular rotation body 22 is then converted to the axial displacement, of the booster piston 18 by the linear motion mechanism 24.

On this occasion, the booster piston 18 moves forward integrally with the input rod 19 toward the inside of the cylinder main body 9 of the master cylinder 8, and the brake hydraulic pressure is generated in the first and second hydraulic chambers 11A and 11B of the master cylinder 3 in accordance with the depression force (thrust) applied from the brake pedal 6 to the input rod 19 and the booster thrust applied from the electric actuator 20 to the booster piston 18. Moreover, the first ECU 26 may receive the detection signals from the hydraulic pressure sensors 29 from the signal line 27, thereby monitoring the hydraulic pressure generated in the master cylinder 8, and may determine whether or not the electric booster 16 is normally operating.

A description is now given of the hydraulic pressure supply device 30 provided independently of the electric booster 16, and serving as a hydraulic pressure control mechanism including hydraulic pressure sources (hydraulic pumps 44) capable of increasing the pressure in the wheel cylinders 4L, 4R, 5L, and 5R.

The hydraulic pressure supply device 30 serving as the ESC is provided between the wheel cylinders 4L, 4R, 5L, and 5R arranged on the sides of the respective wheels (the front, wheels 2L and 2R and the rear wheels 3L and 3R) of the vehicle and the master cylinder 8. The hydraulic pressure supply device 30 is configured to variably control the brake hydraulic pressure generated by the electric booster 16 inside the master cylinder 8 (first and second hydraulic chambers 11A and 11B) as wheel, cylinder pressure (W/C pressure) for the respective wheels, thereby individually supplying the wheel cylinder pressure to the wheel cylinders 4L, 4R, 5L, and 5R for the respective wheels.

In other words, when various types of brake control (e.g., braking force distribution control or distributing the braking force to each of the front wheels 2L and 2R and the rear wheels 3L and 3R, antilock brake control, and vehicle stabilization control) are carried out, the hydraulic pressure supply device 30 supplies a required brake hydraulic pressure from the master cylinder 8 to the wheel cylinders 4L, 4R, 5L, and 5R via the cylinder-side hydraulic pressure pipes 15A and 15B and the like.

On this occasion, the hydraulic pressure supply device 30 distributes and supplies the hydraulic pressure output from the master cylinder 8 (first and second hydraulic chambers 11A and 11B) via the cylinder-side hydraulic pressure pipes 15A and 15B to the wheel cylinders 4L, 4R, 5L, and 5R via brake-side pipe portions 31A, 31B, 31C, and 31D. As a result, the independent braking forces are individually applied to the respective wheels (the front wheels 2L and 2R and the rear wheels 3L and 3R) as described above. The hydraulic pressure supply device 30 includes respective control valves 37, 37', 38, 38', 39, 39', 42, 42', 43, 43', 50, and 50' described later, the electric motor 45 configured to drive the hydraulic pumps 44 and 44', and hydraulic pressure control reservoirs 49 and 49'.

The second ECU 32 is constructed by, for example, a microcomputer and the like, and is configured to electrically apply drive control to the hydraulic pressure supply device 30. In other words, the second ECU 32 serves as a hydraulic pressure supply device controller (a second control unit for the brake control device) configured to control the operation of the hydraulic pressure supply device 30.

The hydraulic pressure sensors 29, the signal line 27, and the vehicle data bus 28 are connected to an input side of the second ECU 32. The respective control valves 37, 37', 38, 38', 39, 39', 42, 42', 43, 43', 50, and 50' described later, the electric motor 45, the signal line 27, and the vehicle data bus 28 are connected to an output side of the second ECU 32. Further, electric power is supplied from the in-vehicle battery (not shown) to the second ECU 32 via the power supply line 52 described later.

On this occasion, the second ECU 32 individually applies drive control to the respective control valves 37, 37', 38, 38', 39, 39', 42, 42', 43, 43', 50, and 50' of the hydraulic pressure supply device 30, the electric motor 45, and the like as described later. As a result, the second ECU 32 carries out the control of decreasing, maintaining, increasing, or pressurizing the brake hydraulic pressure supplied from the brake-side pipe portions 31A to 31D to the wheel cylinders 4L, 4R, 5L, and 5R individually for the wheel cylinders 4L, 4R, 5L, and 5R.

In other words, the second ECU 32 may carry out the operation control for the hydraulic pressure supply device 30 (ESC), thereby carrying out, for example, the following pieces of control (1) to (8). (1) Braking force distribution control of appropriately distributing the braking force to the respective wheels (2L, 2R, 3L, and 3R) in accordance with a vertical load or the like during the braking of the vehicle. (2) Antilock brake control of automatically adjusting the braking forces of the respective wheels (2L, 2R, 3L, and 3R) during the braking, thereby preventing the front wheels 2L and 2R and the rear wheels 3L and 3R from being locked. (3) Vehicle stabilization control of detecting skidding of the respective wheels (2L, 2R, 3L, and 3R) during the travel, and suppressing the understeer and the oversteer while automatically controlling as needed the braking forces applied to the respective wheels (2L, 2R, 3L, and 3R) independently of the operation amount of the brake pedal 6, thereby stabilizing behavior of the vehicle. (4) Hill start assistance control of assisting start by holding a braking state on a hill (particularly on an uphill). (5) Traction control of preventing the respective wheels (2L, 2R, 3L, and 3R) from idling during start or the like. (6) Vehicle following control of maintaining a constant inter-vehicle distance to a preceding vehicle. (7) Lane departure prevention control of keeping the vehicle within a travel lane. (8) Obstacle avoidance control of avoiding collision with an obstacle forward or backward of the vehicle.

The hydraulic pressure supply device 30 includes two systems of a hydraulic circuit, which are a first hydraulic system 33 connected to one output port (namely, the cylinder-side hydraulic pipe 15A) of the master cylinder 8 to supply the hydraulic pressure to the wheel cylinder 4L on the front left wheel 2L side and the wheel cylinder 5R on the rear right wheel 3R side, and a second hydraulic system 33' connected to another output port (namely, the cylinder-side hydraulic pipe 15B) of the master cylinder 8 to supply the hydraulic pressure to the wheel cylinder 4R on the front right wheel 2R side and the wheel cylinder 5L on the rear left wheel 3L side. On this occasion, the first hydraulic system 33 and the second hydraulic system 33' have the same configuration, and thus a description is now given only of the first hydraulic system 33. Components of the second hydraulic system 33' are denoted by adding "'" to the reference numerals thereof, and a description thereof is omitted.

The first hydraulic system 33 of the hydraulic pressure supply device 30 includes a brake pipeline 34 connected to a distal end side of the cylinder-side hydraulic pressure pipe 15A. The brake pipeline 34 branches into a first pipeline portion 33 and a second pipeline portion 36, which are connected respectively to the wheel cylinders 4L and 5R. The brake pipeline 34 and the first pipeline portion 35 construct, together with the brake-side pipe portion 31A, a pipeline for supplying the hydraulic pressure to the wheel cylinder 4L. The brake pipeline 34 and the second pipeline portion 36 construct, together with the brake-side pipe portion 31D, a pipeline for supplying the hydraulic pressure to the wheel cylinder 5R.

The supply control valve 37 for the brake hydraulic pressure is provided on the brake pipeline 34. The supply control valve 37 is constructed by a normally-open electromagnetic switching valve configured to open/close the brake pipeline 34. The pressure increase control valve 38 is provided on the first pipeline portion 35. The pressure increase control valve 38 is constructed by a normally-open electromagnetic switching valve configured to open/close the first pipeline portion 35. The pressure increase control valve 39 is provided on the second pipeline portion 36. The pressure increase control valve 39 is constructed by a normally-open electromagnetic switching valve configured to open/close the second pipeline portion 36.

Meanwhile, the first hydraulic system 33 of the hydraulic pressure supply device 30 includes first and second pressure decrease pipelines 40 and 41 for respectively connecting the wheel cylinder 4L side and the wheel cylinder 5R side to the hydraulic pressure control reservoir 49. The first and second pressure decrease control valves 42 and 43 are respectively provided on those pressure decrease pipelines 40 and 41. The first and second pressure decrease control valves 42 and 43 are constructed by normally-closed electromagnetic switching valves configured to respectively open/close the pressure decrease pipelines 40 and 41.

Moreover, the hydraulic pressure supply device 30 includes the hydraulic pump 44. The hydraulic pump 44 is rotationally driven by the electric motor 45. The hydraulic pump 44 serves as a hydraulic pressure source capable of increasing the pressure in the wheel cylinders 4L and 5R. On this occasion, the electric motor 45 is driven by supply of electric power from the second ECU 32, and the rotation is stopped together with the hydraulic pump 44 when the electric power supply is stopped. A discharge side of the hydraulic pump 44 is connected to a position (that is, a position at which the first pipeline portion 35 and the second pipeline portion 36 branch) on a downstream side with respect to the supply control valve 37 on the brake pipeline 34 via a check valve 46. A suction side of the hydraulic pump 44 is connected to the hydraulic pressure control reservoir 49 via check valves 47 and 48.

The hydraulic pressure control reservoir 49 is provided so as to temporarily store excessive brake fluid, and is configured to temporarily store the excessive brake fluid flowing out from cylinder chambers (not shown) of the wheel cylinders 4L and 5R not only during ABS control by the brake system (hydraulic pressure supply device 30), but also during other brake control. Moreover, the suction side of the hydraulic pump 44 is connected to the cylinder-side hydraulic pipe 15A (that is, a position on an upstream side with respect to the supply control valve 37 on the brake pipeline 34) of the master cylinder 8 via the check valve 47 and the pressurization control valve 50, which is a normally-closed electromagnetic switching valve.

Respective pieces of operation control for the respective control valves 37, 37', 38, 38', 39, 39', 42, 42', 43, 43', 50, and 50', and the electric motor 45 configured to drive the hydraulic pumps 44 and 44' constructing the hydraulic pressure supply device 30 are carried out in predetermined sequences in accordance with control signals output from the second ECU 32.

In other words, during the normal operation toy the braking operation of the driver, the first hydraulic system 33 of the hydraulic pressure supply device 30 directly supplies the hydraulic pressure generated in the master cylinder 3 by the electric booster 16 to the wheel cylinders 4L and 5R via the brake pipeline 34 and the first and second pipeline portions 35 and 36. For example, when the antilock brake control or the like is carried out, the pressure increase control valves 38 and 39 are closed so as to maintain the hydraulic pressure in the wheel cylinders 4L and 5R, and when the hydraulic pressure in the wheel cylinders 4L and 5R is to be decreased, the pressure decrease control valves 42 and 43 are opened so as to release the hydraulic pressure in the wheel cylinders 4L and 5R to the hydraulic pressure control reservoir 49.

Moreover, when the hydraulic pressure supplied to the wheel cylinders 4L and 5R is increased in order to carry out the stabilization control (antiskid control) or the like during the vehicle travel, the hydraulic pump 44 is operated by the electric motor 45 while the supply control valve 37 is opened, and the brake fluid discharged from the hydraulic pump 44 is supplied to the wheel cylinders 4L and 5R via the first and second pipeline portions 35 and 36. On this occasion, the pressurization control valve 50 is opened, and the brake fluid in the reservoir 14 is thus supplied from the master cylinder 8 side to the suction side of the hydraulic pump 44.

In this way, the second ECU 32 controls the operations of the supply control valve 37, the pressure increase control valves 38 and 39, the pressure decrease control valves 42 and 43, the pressurization control valves 50, and the electric motor 45 (namely, the hydraulic pump 44) based on the vehicle operation information and the like, thereby appropriately holding, decreasing, or increasing the hydraulic pressure supplied to the wheel cylinders 4L and 5R. As a result, the brake control, for example, the braking force distribution control, the vehicle stabilization control, brake assist control, the antilock brake control, the traction control, and the hill start assistance control, is carried out.

On the other hand, in a normal control mode carried out while the electric motor 45 (namely, the hydraulic pump 44) is stopped, the supply control valve 37 and the pressure increase control valves 38 and 39 are opened, and the pressure decrease control valves 42 and 43 and the pressurization control valve 50 are closed. In this state, when the first piston (namely, the booster piston 18 and the input rod 19) and the second piston 10 of the master cylinder 8 are axially displaced in the cylinder main body 9 in response to the depression operation on the brake pedal 6, the brake hydraulic pressure generated in the first hydraulic chamber 11A is supplied from the cylinder-side hydraulic pipe 15A side to the wheel cylinders 4L and 5R via the first hydraulic system 33 and the brake-side pipe portions 31A and 31D of the hydraulic pressure supply device 30. The brake hydraulic pressure generated in the second hydraulic chamber 11B is supplied from the cylinder-side hydraulic pressure pipe 15B side to the wheel cylinders 4R and 5L via the second hydraulic system 33' and the brake-side pipe portions 31B and 31C.

Moreover, when the booster piston 18 and the electric motor 21 cannot operate due to a failure in the electric booster 16, the brake hydraulic pressure generated in the first and second hydraulic chambers 11A and 11B is detected by the hydraulic pressure sensors 29 connected to the second ECU 32 in order to carry out the assist control of increasing the pressure in the respective wheel cylinders so that the pressure becomes a wheel cylinder pressure corresponding to the detection values as the operation amount of the brake pedal 6. In the assist control, the pressurization control valve 50 and the pressure increase control valves 38 and 39 are opened, and the supply control valve 37 and the pressure decrease control valves 42 and 43 are appropriately opened or closed. In this state, the hydraulic pump 44 is operated by the electric motor 45, and the brake fluid discharged from the hydraulic pump 44 is supplied to the wheel cylinders 4L and 5R via the first and second pipeline portions 33 and 36. As a result, the braking forces by the wheel, cylinders 4L and 5R can be generated by the brake fluid discharged from the hydraulic pump 44 based on the brake hydraulic pressure generated on the master cylinder 8 side.

As the hydraulic pump 44, a publicly known hydraulic pump, for example, a plunger pump, a trochoid pump, and a gear pump can be used, but a gear pump is preferred in terms of vehicle installation property, silence property, pump efficiency, and the like. As the electric motor 45, a publicly known motor, for example, a DC motor, a DC brushless motor, and an AC motor can be used, but a DC motor is selected as the electric motor 45 in terms of vehicle installation property and the like according to this embodiment.

Moreover, characteristics of the respective control valves: 37, 38, 35, 42, 43, and 50 of the hydraulic pressure supply device 30 can be appropriately set depending on respective usage forms, and even when control signals from the second ECU 32 do not exist, the hydraulic pressure can be supplied from the master cylinder 8 to the wheel cylinders 4L and 5R by setting, out of the control valves, the supply control valve 37 and the pressure increase control valves 38 and 39 as normally-open valves, and setting the pressure decrease control valves 42 and 43 and the pressurization control valve 50 as normally-closed valves. Thus, this configuration is preferred in terms of failsafe and control efficiency of the brake system.

A regenerative cooperation control device 51 for power charging is connected to the vehicle data bus 28 installed in the vehicle. The regenerative cooperation control device 51 is constructed by a microcomputer or the like similarly to the first and second ECUs 26 and 32, and is configured to use inertial forces generated by the rotation of the respective wheels during deceleration, braking, or other action of the vehicle to control a drive motor (not shown) for vehicle drive, thereby acquiring braking forces while kinetic energy generated at the time is recovered (regenerated) as electric power.

On this occasion, the regenerative cooperation control device 51 is connected to the first ECU 26 and the second ECU 32 via the vehicle data bus 28, and constructs a regenerative braking control unit configured to control a regenerative braking amount. Further, the regenerative cooperation control device 51 is connected to the in-vehicle power supply line 52. This power supply line 52 is configured to supply the electric power from the in-vehicle battery (not shown) to the first and second ECUs 26 and 32, the regenerative cooperation control device 51, and the like.

Referring to FIG. 3, a description is now given of a configuration of control of the electric booster 16 by the first ECU 26.

As illustrated in FIG. 3, the first ECU 26 includes an M/C hydraulic pressure conversion processing part 26A, a deviation calculation part 26B, a motor rotation position conversion processing part 26C, and a motor command calculation processing part 26D. On this occasion, when, the pedal stroke is input from the operation amount detector 7 by the depression operation of the vehicle driver, the M/C hydraulic pressure conversion processing part 26A acquires a target M/C hydraulic pressure as a target hydraulic pressure corresponding to the operation amount (pedal stroke) at this time. The target M/C hydraulic pressure can be acquired based on a relationship (table information) between the operation, amount and the target M/C hydraulic pressure stored in a memory (not shown) of the first ECU 26. The target M/C hydraulic pressure acquired by the M/C hydraulic pressure conversion processing part 26A is output as a target M/C hydraulic pressure command from the M/C hydraulic pressure conversion processing part 36A.

The M/C hydraulic pressure command output from the M/C hydraulic pressure conversion processing part 26A is subtracted from the actual brake pressure (M/C hydraulic pressure) detected by the hydraulic pressure sensors 29 by the deviation calculation part 26B, and is calculated as a hydraulic pressure deviation therebetween. This hydraulic pressure deviation is input to the motor rotation position conversion processing part 26C, The motor rotation position conversion processing part 26C is configured to convert the hydraulic pressure deviation to a position deviation based on a conversion coefficient stored in, for example, the memory of the first ECU 26. This position deviation is acquired as a deviation of an actual position (the motor rotation position of the electric motor 21 detected by the rotation sensor 21A) from a target position of the booster piston 18.

The position deviation acquired by the motor rotation position conversion processing part 26C is input to the motor command calculation processing part 26D. This motor command calculation processing part 26D is configured to calculate a motor drive current (motor operation command, namely, motor output command) from the position deviation, the motor rotation position and motor rotation speed from the rotation sensor 21A, and the motor current from the current sensor 21B. On this occasion, the motor command calculation processing part 26D uses the detection signals from the rotation sensor 21A and the current sensor 21B to carry out feedback control for the motor rotation position, the motor rotation speed, and the motor current of the electric motor 21.

The motor drive current output from the motor command calculation processing part 26D is supplied as the supplied power to the motor 21 of the electric actuator 20, which is a drive source of the electric booster 16. When the booster piston 18 is displaced in the axial direction of the master cylinder 8 by the rotational drive of the electric motor 21, the brake hydraulic pressure (M/C pressure) is accordingly generated in the hydraulic chambers 11A and 11B of the master cylinder 8. The hydraulic pressure is distributed and supplied to the respective wheel cylinders 4L, 4R, 5L, and 5R via the hydraulic pressure supply device 30 to generate the braking forces on the respective wheels 2L, 2R, 3L, and 3R.

Figure 4:
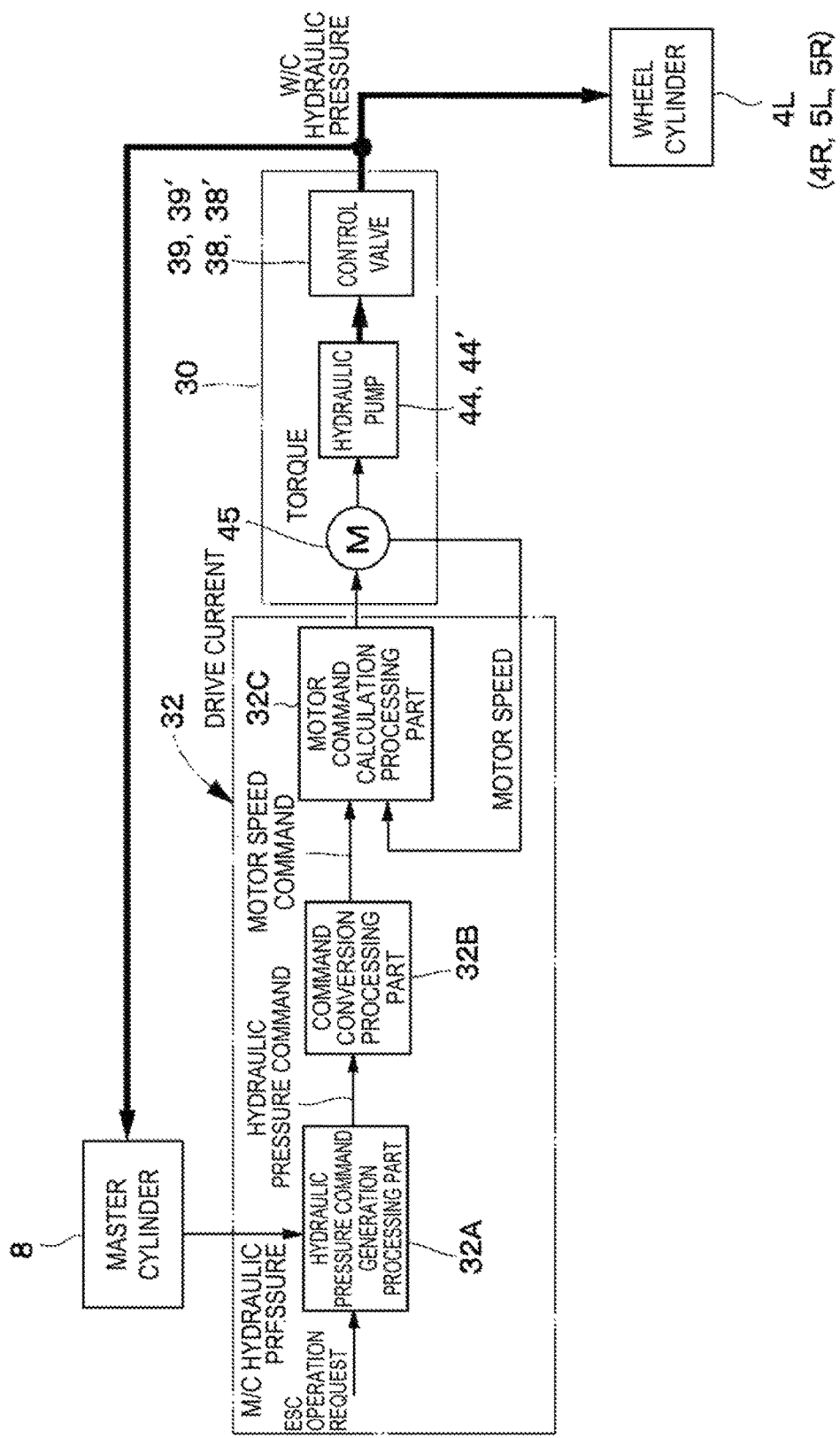
FIG. 4 is a block diagram for illustrating a hydraulic pressure control mechanism of the brake control device.

Referring to FIG. 4, a description is now given of a configuration of control of the hydraulic pressure supply device 30 by the second ECU 32.

As illustrated in FIG. 4, the second ECU 32 includes a hydraulic pressure command generation processing part 32A, a command conversion processing part 323, and a motor command calculation processing part 32C. Here, for example, when an ESC operation request is input from the first ECU 20, and the master cylinder pressure is input from the hydraulic pressure sensors 28, the hydraulic pressure command generation processing part 32A acquires a command hydraulic pressure corresponding to the master cylinder pressure at this time. The command hydraulic pressure may be, for example, the master cylinder pressure multiplied by a gain G.

The command hydraulic pressure output from the hydraulic pressure command generation processing part 32A is input to the command conversion processing part 32B. This command conversion processing part 32B is configured to convert the hydraulic pressure command to a motor operation command (e.g., an operation time command and a motor speed command), and input the motor operation command to the motor command calculation processing part 32C. The motor command calculation processing part 32C is configured to calculate a drive current (motor operation command, namely, motor output command) from the motor operation command and the motor speed. On this occasion, the motor command calculation processing part 32C uses, for example, a detection signal from a rotation sensor (not shown) provided on the electric motor 45, thereby applying feedback control to the motor speed of the electric motor 45.

The drive current output from the motor command calculation processing part 32C is supplied as supply power to the electric motor 45, which is the drive source of the hydraulic pressure supply device 30, to drive the hydraulic pumps 44 and 44' with the rotational drive of the electric motor 45. When the hydraulic pumps 44 and 44' are driven, the brake fluid is transmitted to the pressure increase control valves 38, 38', 39, and 39' to increase the wheel cylinder pressure in the respective wheel cylinders 4L, 4R, 5L, and 5R. As a result, the braking forces are generated on the wheels 2L, 2R, 3L, and 3R.

A detailed description is now given of operations of the respective control valves 37, 37', 38, 38', 39, 39', 42, 42', 43, 43', 50, and 50' when the pressure is increased and decreased.

When the pressure is increased and decreased, the pressurization control valves 50 and 50' are normally opened, the pressure decrease control valves 42, 42', 43, and 43' are normally closed, and the pressure increase control valves 38, 38', 39, and 39' are normally opened. Then, when the pressure is increased, the supply control valves 37 and 37' are closed. In this case, the brake fluid that has passed through the pressure increase control valves 33, 33', 39, and 39' by the electric motor 45 is transmitted, to the wheel cylinders 4L, 4R, 3L, and 3R, thereby generating the braking forces.

On the other hand, when the pressure is decreased, opening degrees of the supply control valves 37 and 37' are controlled (adjusted) based on the master cylinder pressure detection value defected by the hydraulic pressure sensors 29 and a target differential pressure set based on the master cylinder pressure detection value and a target boost ratio, thereby releasing the brake fluid to the hydraulic pressure control reservoirs 49 and 49' via the master cylinder 8 and the pressurization control valves 50 and 50'. According to the embodiment, the target boost ratio is defined as the control gain G, and the opening degrees of the supply control valves 37 and 37' are adjusted (varied) in accordance with this control gain G and the master cylinder pressure.

Incidentally, when the communication between the first ECU 26 of the electric booster 16 and the second ECU 32 of the hydraulic pressure supply device 30 is not carried out normally, the following cases are considered to be the causes.

(1) The signal line 27 is disconnected due to line disconnection or the like, and thus information cannot be transmitted between the second ECU 32 and the first ECU 26.
(2) The drive control by the electric actuator 20 is normally operating in the first ECU 26, but the communication to/from the second ECU 32 is erroneously recognized to be normal.
(3) The first ECU 26 is normally operating, but the second ECU 32 erroneously recognizes that the communication to/from the first ECU 26 is abnormal.

In those cases, the second ECU 32 determines that the electric booster 16 has failed, and it is thus conceivable that the second ECU 32 uses the hydraulic pressure supply device 30 to generate the braking forces (carry out the assist control) in response to the operation on the brake pedal 6 by the driver. This is because the possibility that the electric booster 16 is abnormal while the communication is disconnected is not zero, that is, such a case that the wheel cylinders 4L, 4R, 5L, and 5R cannot be pressurized by the electric booster 16 is conceivable.

However, when the electric booster 16 is normally operating, the insides of the wheel cylinders 4L, 4R, 5L, and 5R are pressurized by both the electric booster 16 and the hydraulic pressure supply device 30. Therefore, the pressurization insides of the wheel cylinders 4L, 4R, 5L, and 5R by both the electric booster 16 and the hydraulic pressure supply device 30 may cause excessive braking forces (double boosting) corresponding to the operation amount of the brake pedal 6. Those excessive braking forces result in excessive deceleration or the vehicle with respect to line operation amount of the brake pedal 6 and may cause, for example, a sense of discomfort felt by the driver.

Meanwhile, it is conceivable to provide a device (e.g., third control unit) configured to monitor, for example, both the first ECU 26 and the second ECU 32, in order to prevent the braking forces from being excessive. However, the addition of the device for monitoring leads to an increase in the cost as well as fear of change in the layout of various devices.

Thus, according to this embodiment, the second ECU 32 includes a backup control mechanism configured to detect, when the second ECU 32 cannot transmit the information to the first ECU 26 due to, for example, a disconnection of the signal line 27, the braking operation amount of the driver based on the signals input from the hydraulic pressure sensors 29, and to operate the hydraulic pressure supply device 30 based on the detected b raking operation amount, to thereby pressurize the ins ides of the wheel cylinders 4L 4R, 5L, and 5R. Specifically, the second ECU 32 includes the backup control mechanism illustrated as a control flow of FIG. 5.

In this case, the second ECU 32 decreases a pressurization amount of the pressure inside the wheel cylinders 4L, 4R, 5L, and 5R when the pressure in the master cylinder 8 exceeds a predetermined value during the backup control. In other words, the backup control mechanism of the second ECU 32 includes a pressurization amount reduction control part (processing of S5, S10, S11, and S12 of FIG. 5) configured to carry out control of reducing the pressurization amount by the hydraulic pressure supply device 30 when the pressure (M/C pressure) in the master cylinder 8 exceeds the predetermined value (PM0) during the backup control.

Figure 6:
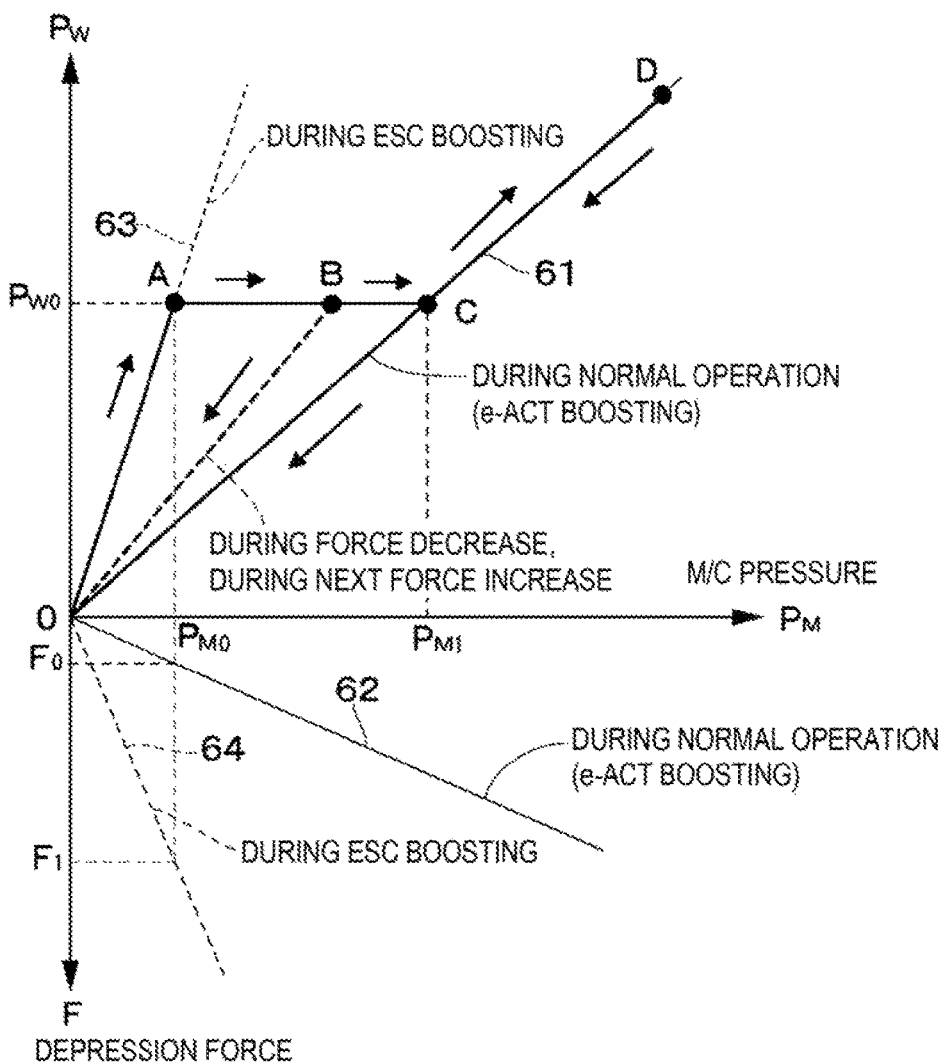
FIG. 6 is a characteristic graph for shoving an example of a relationship among an M/C pressure (Pm), a W/C pressure calculated value (Pw), and a depression force (F).

Referring to FIG. 6, a description is given of the control (backup control including the pressurization amount reduction control) carried out by the second ECU 32.

In FIG. 6, the master cylinder hydraulic pressure (M/C pressure) is assigned to the horizontal axis and a calculated value of the wheel cylinder pressure (W/C pressure) and the pedal depression force are assigned to the vertical axis, and there are shown a characteristic (characteristic lines 61 and 62) during the normal braking (boosting only by the electric booster 16) and a characteristic (characteristic lines 63 and 64) during the failure (boosting only by the hydraulic pressure supply device 30) of the electric booster 16.

During the normal braking, as represented as the characteristic line 61, the control is carried out so that the M/C pressure (PM) and the W/C hydraulic pressure (Pw) are equal (gradient is 1). On this occasion, a gradient of the input (driver input, depression force) on the brake pedal 6 with respect to the master cylinder pressure is gentle as represented as the characteristic line 62. In contrast, when the electric booster 16 has failed, the gradient of the input (driver input, depression force) on the brake pedal 6 with respect to the master cylinder pressure is steep as represented as the characteristic line 64.

On this occasion, when the depression force that can be generated by an ordinary driver is represented by F1, the master cylinder pressure at the depression force F1 is PM0. Therefore, when the electric booster 16 has failed, and the master cylinder pressure is caused to reach PM0 by the hydraulic pressure supply device 30, the W/C hydraulic pressure is controlled to become Pw0 so that the driver can stop the vehicle without excessive effort. Then, according to this embodiment, the second ECU 31 uses the hydraulic pressure sensors 29 to detect the master cylinder pressure PM to determine whether or not the electric booster 16 has failed. In other words, a target W/C pressure for the hydraulic pressure supply device 30 calculated by the second ECU 32 is changed in the following way in accordance with the magnitude of the defected master cylinder pressure.

When the master cylinder pressure is equal to or less than PM0, the second ECU 32 cannot determine whether or not the electric booster 16 is operating. Therefore, when the master cylinder pressure is equal to or less than PM0, the second ECU 32 carries out the boosting pressurization inside the wheel cylinders 4L, 4R, 3L, and 3R) by the hydraulic pressure supply device 30 carried out when the electric booster 16 has failed. Specifically, the second ECU 32 closes the supply control valves 37 and 37' to operate the electric motor 45 for the hydraulic pumps 44 and 44' at a control gain G0.

(2) When the master cylinder pressure is from PM0 to PHI, the W/C hydraulic pressure attained by the hydraulic pressure supply device 30 is controlled to be Pw0. In other words, the control gain G is decreased from G0 as the M/C pressure is increased by the electric booster 16. As a result, a pressurization amount of the pressure inside the wheel cylinders 4L, 4R, 5L, and 5R by the hydraulic pressure supply device 30 decreases. In this way, according to this embodiment, the predetermined value (determination value or threshold) for decreasing the pressurization amount during the backup control is set to PM0. In this case, the predetermined value PM0 is set as the pressure value that can be supplied from the master cylinder 8 when the electric booster 16 is not operating.

(3) When the master cylinder pressure exceeds PHI (=Pw0), the boosting by the hydraulic pressure supply device 30 is stopped, and the boosting is carried out only by the electric booster 16. In other words, the control gain G is set to 0, the supply control valves 37 and 37' are opened, and the electric motor 45 for the hydraulic pumps 44 and 44' is stopped.

Figure 7:
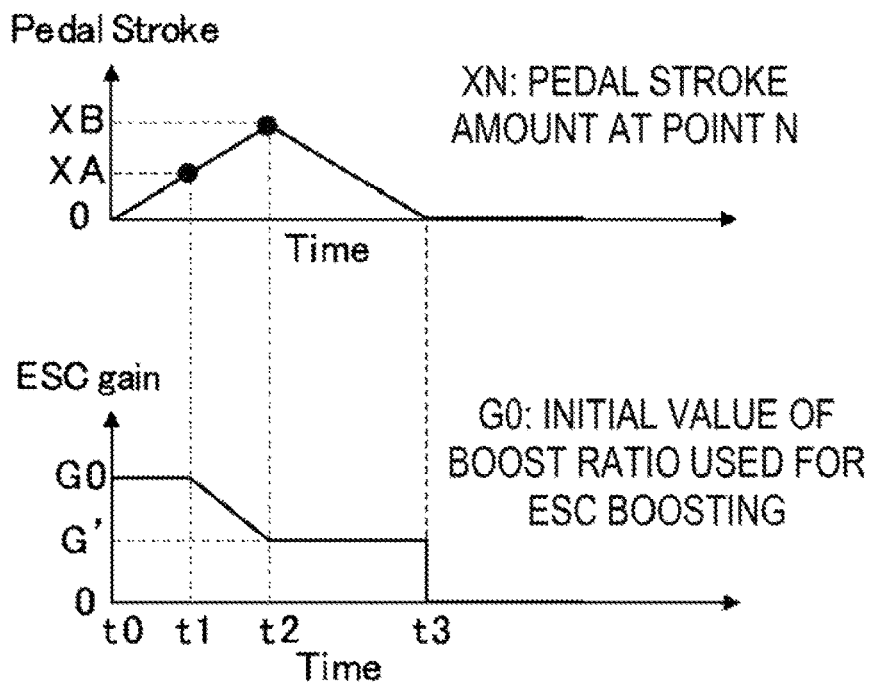
FIG. 7 is a characteristic graph for showing an example of temporal changes in a pedal stroke and a gain of the hydraulic pressure control mechanism.
Figure 8:
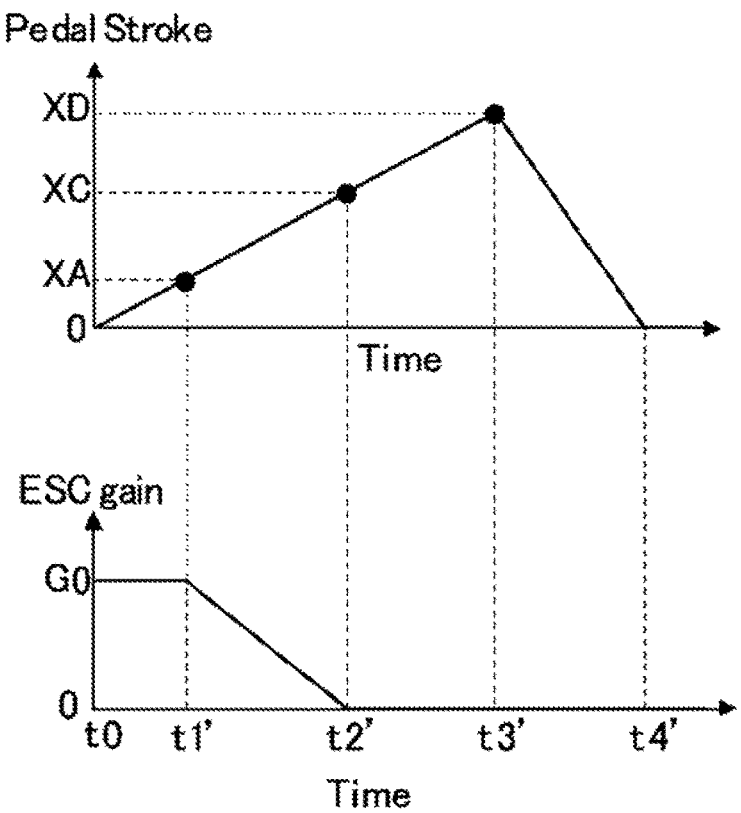
FIG. 8 is a characteristic graph for showing another example of the temporal changes in the pedal stroke and the gain of the hydraulic pressure control mechanism.

Referring to FIG. 7 and FIG. 8 in addition to FIG. 6, a description is now given of how to adjust the target wheel cylinder pressure Pw of the hydraulic pressure supply device 30 calculated by the second ECU 32 in accordance with a generation pattern of the master cylinder pressure. FIG. 7 is a graph for showing temporal changes in a pedal stroke X and the control gain G when the driver operates the brake pedal so as to follow a path of 0→A→B→0 of FIG. 6. Moreover, FIG. 8 is a graph for showing temporal changes in the pedal stroke X and the control gain G when the driver operates the brake pedal so as to follow a path of 0→A→B→C→D→0 of FIG. 6.

In FIG. 7, a period until a time t1 (point 0 to point A of FIG. 6) is a period in which the detected master cylinder pressure is low, and whether or not the boosting by the electric booster 16 is being carried out cannot thus be determined. Therefore, the second ECU 32 sets the control gain G to G0, namely, the control gain G0 for the boosting carried out by the hydraulic pressure supply device 30 when the electric booster 16 has failed, thereby calculating the target wheel cylinder pressure Pw.

A subsequent period, that is, a period from the time t1 to a time t2 (point A to point B of FIG. 6) is a period in which the detected master cylinder pressure exceeds the value that can be output when the electric booster 16 has failed. Therefore, the second ECU 32 decreases the control gain G from G0 so that the target wheel, cylinder pressure Pw is constant (Pw0). A subsequent period, that is, a period from the time t2 to a time t3 (point B to point 0 of FIG. 6) is a period in which the driver releases the brake pedal 6. Therefore, the second ECU 32 sets the control gain G to be constant at a value G' calculated at the time t2, thereby calculating the target wheel cylinder pressure Pw. In this way, when the pressure in the master cylinder exceeds the predetermined value PM0, the second ECU 32 decreases the pressure inside the wheel cylinders 4L, 4R, 5L, and 5R in accordance with the pressure in the master cylinder at the time when the operation is released during the braking operation while the pressure exceeds the predetermined value PM0. On this occasion, the second ECU 32 stores a decrease rate (control gain G') in the memory.

Next, in FIG. 8, a period until a time t1" (point 0 to point A of FIG. 6) is a period in which the detected master cylinder pressure is low, and whether or not the boosting by the electric booster 16 is being carried out cannot thus be determined. Therefore, the second ECU 32 sets the control gain G to G0, namely, the control gain G0 for the boosting carried out by the hydraulic pressure supply device 30 when the electric booster 16 has failed, thereby calculating the target wheel cylinder pressure Pw.

A subsequent period, that is, a period from the time t1' to a time t2' (point A to point G of FIG. 6) is a period in which the detected master cylinder pressure exceeds the value that can be output when the electric booster 16 has failed. Therefore, the second ECU 32 decreases the control gain G from G0 so that the target wheel cylinder pressure Pw is constant (Pw0). A subsequent period, that is, a period from the time t2' to a time t3' (point C to point D of FIG. 6) is a period in which the master cylinder pressure is equal to or more than the target wheel cylinder pressure Pw (Pw0). Therefore, the second ECU 32 sets the control gain G to be constant at a value (0) calculated at the time t2', thereby using only the electric booster 16 for the boosting. In other words, the supply control valves 37 and 37' are opened, and the electric motor 45 for the hydraulic pumps 44 and 44' is stopped.

A subsequent period, that is, a period from the time t3' to a time t4' (point D to point 0 of FIG. 6) is a period in which the driver releases the brake pedal 6. Therefore, the second ECU 32 sets the control gain G to the constant at the value (0) calculated at the time t3', thereby using only the electric booster 16 for the boosting. In other words, as in the period from the time t2' to the time t3', the supply control valves 37 and 37' are opened, and the electric motor 45 for the hydraulic pumps 44 and 44' is maintained to be stopped.

Also in this case, when the pressure in the master cylinder exceeds the predetermined value PM0, the second ECU 32 decreases the pressure inside the wheel cylinders 4L, 4R, 5L, and 5R in accordance with the pressure in the master cylinder 8 when the operation is released during the braking operation while the pressure exceeds the predetermined value PM0. On this occasion, the second ECU 32 stores the decrease rate (control gain G=0) of decreasing the pressure in the wheel cylinders 4L, 4R, 5L, and 5R in the memory. A description is later given of the boosting control carried out in the hydraulic pressure supply device 30, namely, the processing of FIG. 5 carried out by the second ECU 32.

The brake control device according to this embodiment has the above-mentioned configuration. A description is now given of the operation thereof.

First, when the driver of the vehicle carries out the depression operation on the brake pedal 6, the input rod 19 is pushed in the direction indicated by the arrow A by this operation, and the detection signal from the operation amount detector 7 is input to the first ECU 26. The first ECU 26 carries out operation control for the electric actuator 20 of the electric booster 16 in accordance with the detection value. In other words, the first ECU 26 supplies the electric power to the electric motor 21 based on the detection signal from the operation amount detector 7, thereby rotationally driving the electric motor 21.

The rotation of the electric motor 21 is transmitted to the tubular rotation body 12 via the speed reduction mechanism 23. The rotation of the tubular rotation body 22 is then converted to the axial displacement of the booster piston 18 by the linear motion mechanism 24. As a result, the booster piston 18 of the electric booster 16 moves forward toward the inside of the cylinder main body 9 of the master cylinder 8, to thereby generate the brake hydraulic pressure in the first and second hydraulic chambers 11A and 11B of the master cylinder 8 in accordance with the depression force (thrust) applied from the brake pedal 6 to the input rod 19, and the booster thrust applied from the electric actuator 20 to the booster piston 18.

Then, the hydraulic pressure supply device 30 provided between the wheel cylinders 4L, 4R, 5L, and 5R on the sides of the respective wheels (the front wheels 2L and 2R and the rear wheels 3L and 3R) and the master cylinder 8 distributes and supplies as the master cylinder pressure the hydraulic pressure generated by the electric booster 16 inside the master cylinder 8 (first and second hydraulic chambers 11A and 11B) from the cylinder-side hydraulic pressure pipes 15A and 15B to the wheel cylinders 4L, 4R, 5L, and 5R via the hydraulic pressure systems 33 and 33' and the brake-side pipe portions 31A, 31B, 31C, and 31D in the hydraulic pressure supply device 30 as the wheel cylinder pressure for the respective wheels while variably controlling the hydraulic pressure. As a result, the appropriate braking forces are applied to the wheels (the respective front wheels 2L and 2R and the respective rear wheels 3L and 3R) of the vehicle via the wheel cylinders 4L, 4R, 5L, and 5R.

Moreover, the second ECU 32 configured to control the hydraulic pressure supply device 30 supplies the electric power to the electric motor 45 based on the detection signal from the operation amount detector 7 received via the signal line 27 and the like, thereby operating the hydraulic pumps 44 and 44' and selectively opening/closing the respective control valves 37, 37', 38, 38', 39, 39', 42, 42', 43, 43', 50, and 50'. As a result, the braking force distribution control, the antilock brake control, the vehicle stabilization control, the hill start assistance control, the traction control, the vehicle following control, the lane departure prevention control, the obstacle avoidance control, and the like can be carried out.

Further, when the second ECU 32 cannot transmit the information to the first ECU 26, that is, the signal is not transmitted from the first ECU 26, the second ECU 32 carries out the backup control of operating the hydraulic pressure supply device 30 to pressurize the insides of the wheel cylinders 4L, 4R, 5L, and 5R. In this case, the second ECU 32 carries out the control (pressurization amount reduction control) of reducing the pressurization amount of the pressure inside the wheel cylinders 4L, 4R, 5L, and 5R when the pressure in the master cylinder 8 exceeds the predetermined value (PM0) during the backup control.

Figure 5:
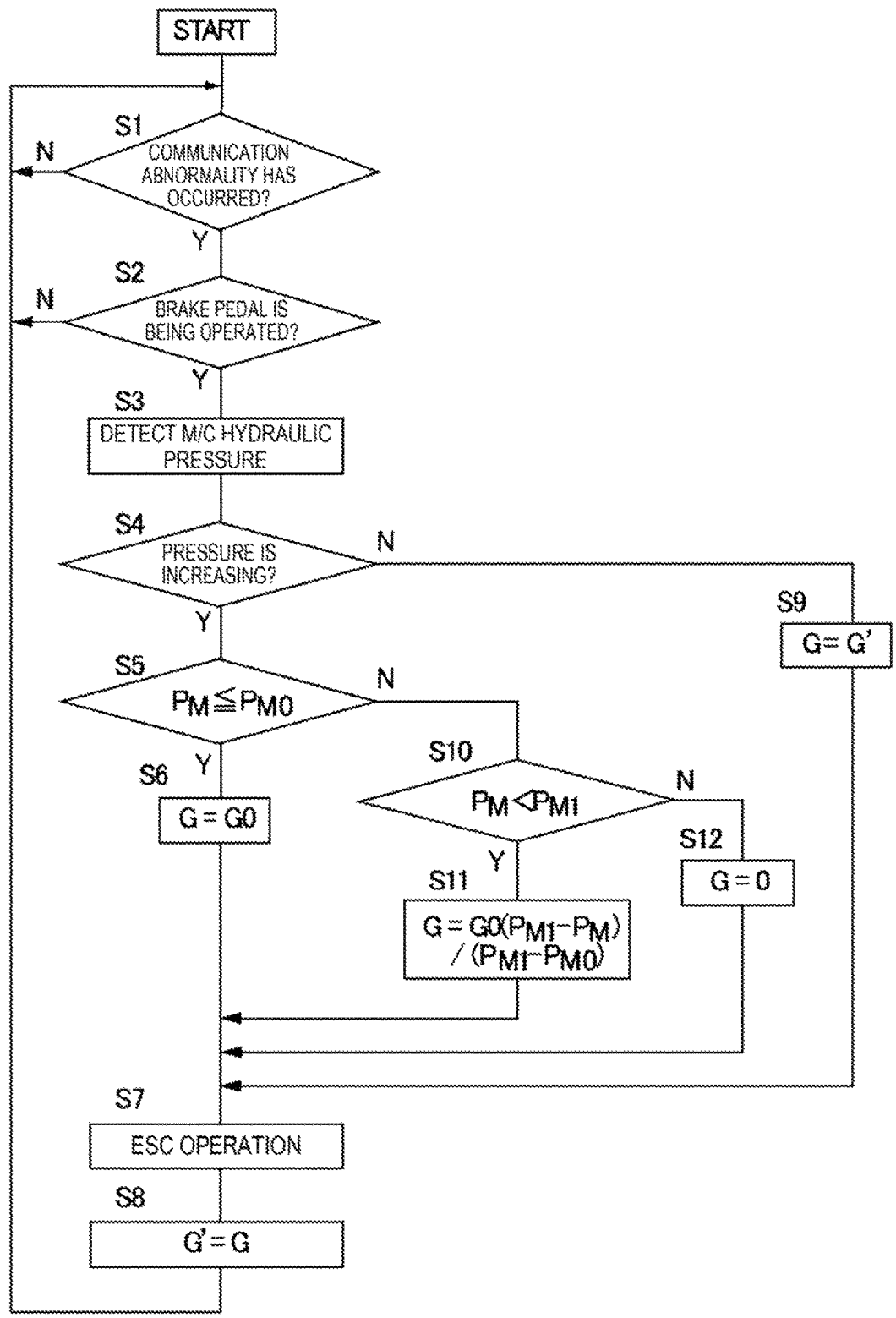
FIG. 5 is a flowchart for illustrating control processing according to a first embodiment of the present invention.

Referring to the flowchart of FIG. 5, a description is now given of the control (the backup control and the pressurization amount reduction control) carried out by the second ECU 32. The process log of FIG. 5 is repeated after each predetermined control period (at a predetermined control cycle) by the second ECU 32, for example, while the electric power is supplied to the second ECU 32.

When the processing operation of FIG. 5 is started by the start of the electric power supply to the second ECU 32, in S1, the second ECU 32 determines whether or not the communication abnormality has occurred. In other words, in S1, it is determined whether or not information can be transmitted to/from the first ECU 26 via the signal line 27. This determination can be made based on, for example, whether or not a signal constantly received from the first ECU 26 can be received. When a determination "NO" is made in S1, that is, the communication abnormality is determined not to have occurred, the second ECU 32 returns to a point before S1, and repeats the processing starting from S1.

On the other hand, when a determination "YES" is made in S1, that is, the communication abnormality is determined to have occurred, the second ECU 32 proceeds to S2, and determines whether or not the brake pedal 6 is being operated. This determination can be made based on a signal acquired from the vehicle data bus 28, for example, a signal output from a brake switch (not shown) (brake ON/OFF signal) or the like. When a determination "NO" is made in S2, that is, the brake pedal 6 is determined as not being operated, the second ECU 32 returns to the point before S1, and repeats the processing starring from S1. When the determination "YES" is made in S1, for example, an alarm representing the communication abnormality can be reported to the driver by, for example, displaying the occurrence of the abnormality on a display device provided in front of a driver's seat and/or outputting the occurrence of the abnormality from a sound device.

On the other hand, when a determination "YES" is made in S2, that is, the brake pedal 6 is determined as being operated, the second ECU 32 proceeds to S3, and detects the master cylinder pressure. This detection is carried out by using the hydraulic pressure sensors 29 connected to the second ECU 32. Then, in S4, the second ECU 32 determines whether or not the master cylinder pressure is increasing. When a determination "YES" is made, that is, the pressure is determined to be increasing, the second ECU 32 proceeds to S5. In S5, the second ECU 32 determines whether or not the master cylinder pressure PM is equal to or less than the predetermined value PM0. This predetermined value PM0 is set as the pressure value that can be supplied from the master cylinder 8 toy the depression force F1 that can be generated by an ordinary driver while the electric booster 16 is not operating.

When a determination "YES" is made in S3, that is, the master cylinder pressure PM is determined to be equal to or less than the predetermined value PM0 (PM≤PM0), the second ECU 32 proceeds to S6, sets the control gain G for calculating the target W/C hydraulic pressure for the boosting to G0 (G=G0), which is the initial set value, in order to carry out the boosting by the hydraulic pressure supply device 30, and proceeds to S7. On this occasion, the initial set value G0 of the control gain G is the control gain G0 for the boosting carried out by the hydraulic pressure supply device 30 when the electric booster 16 has failed.

In S7, the second ECU 32 operates the electric booster 16 in accordance with the control blocks illustrated in FIG. 4. Specifically, in S7, the second ECU 32 calculates the target W/C hydraulic pressure, thereby driving the electric motor 45 for the hydraulic pumps 44 and 44''. Then, in S8, the second ECU 32 stores a control gain current value (G=G0), which is a value of the current control gain, in the memory of the second ECU 32 as a control gain stored value G' (=G0), and returns to S1.

On the other hand, when a determination "NO" is made in S4 that is, the master cylinder pressure PM is determined not to be increasing, the second ECU 32 proceeds to S3. In S9, the second ECU 32 sets the control gain G to the current control gain stored value G', and proceeds to S7. The processing of S7 and S8 is as described above.

On the other hand, when a determination "NO" is made in S5, that is, the master cylinder pressure PM is determined to be more than the predetermined value PM0 (PM>PM0), the second ECU 32 proceeds to S10, and determines whether or not the master cylinder pressure PM is less than the predetermined value PM1. The predetermined value PM1 can be set as the maximum wheel cylinder pressure Pw0 generated in the wheel cylinders 4L, 4R, 5L, and 5R by the boosting only by the hydraulic pressure supply device 30 at the depression force F1 that can be generated by an ordinary driver. In other words, the predetermined value PM1 can be set as the maximum target wheel cylinder pressure Pw (=Pw0) of the hydraulic pressure supply device 30.

When a determination "YES" is made in S10, that is, the master cylinder pressure PM is determined to be less than the predetermined value PM1 (PM<PM1), the second ECU 32 proceeds to S11. In S11, the second ECU 33 calculates the control gain G for calculating the target W/C hydraulic pressure for the boosting by the hydraulic pressure supply device 30 based on Expression 1, and proceeds to S7. In Expression 1, Pm denotes the master cylinder pressure, namely, the hydraulic pressure detection value PM detected by the hydraulic pressure sensors 29.

$$G = \frac{G0(P_{M1} - P_M)}{(P_{M1} - P_{M0})} \qquad \text{[Expression 1]}$$

On the other hand, when a determination "NO" is made in S10, that is, the master cylinder pressure PM is determined to be equal to or more than the predetermined value PM1 (PM≥PM1), the second ECU 32 proceeds to S12. In S12, the second ECU 32 sets the control gain G to 0, and proceeds to S7.

As a result, according to this embodiment, it is possible to prevent the braking forces from being excessive when the information cannot be transmitted between the first ECU 26 configured to control the operation of the electric booster 16 and the second ECU 32 configured to control the operation, of the hydraulic pressure control mechanism 30.

Specifically, according to this embodiment, when the second ECU 32 becomes unable to transmit information to the first ECU 26, the second ECU 32 uses the processing starting from S2 of FIG. 6 to carry out the backup control. During this backup control, when the electric booster 16 is normally operating, the insides of the wheel cylinders 4L, 4R, 5L, and 5R are pressurized by both the electric booster 16 and the hydraulic pressure supply device 30. On this occasion, when the pressure in the master cylinder 3 exceeds the predetermined value PM0, the hydraulic pressure supply device 30 decreases the pressurization amount of the pressure in the wheel cylinders 4L, 4R, 5L, and 5R by the processing of S5, S10, S11, and S12 of FIG. 6.

In this case, the predetermined value PM0 is set as the pressure value that can be supplied from the master cylinder 8 when the electric booster 16 is not operating. Therefore, when the electric booster 16 is normally operating, and the pressure value of the master cylinder 8 exceeds the predetermined value PM0, the pressurization amount of the hydraulic pressure supply device 30 decreases. As a result, it is possible to prevent the braking forces from being excessive based on a decrease in pressurization amount of the hydraulic pressure supply device 30 even when both the electric booster 16 and the hydraulic pressure supply device 30 increase the pressure inside the wheel cylinders 4L, 4R, 5L, and 5R.

On the other hand, when the second ECU 32 cannot transmit information to the first ECU 26, and the electric booster 16 cannot increase the pressure Inside the wheel cylinders 4L, 4R, 5L, and 5R, the hydraulic pressure supply device 30 pressurizes the insides of the wheel cylinders 4L, 4R, 5L, and 5R in the processing of S3 and S6. On this occasion, the hydraulic pressure supply device 30 does not decrease the pressurization amount until, the pressure in the master cylinder 8 becomes the predetermined value PM0. In other words, the hydraulic pressure supply device 30 can set the control gain G to G0, thereby increasing the pressurization amount until the pressure in the master cylinder 8 becomes the predetermined value PM0. As a result, even when the information cannot be transmitted between the first ECU 26 and the second ECU 32, and the electric booster 16 cannot increase the pressure in the wheel cylinders 4L, 4R, 5L, and 5R, the required braking forces (Pw=Pw0) can be secured.

In this embodiment, the second ECU 32 is configured to decrease the pressure inside the wheel cylinders 4L, 4R, 5L, and 5R in accordance with the pressure inside the master cylinder 8 when the braking operation is released during the braking operation while the pressure in the master cylinder 8 exceeds the predetermined value PM0, and store the decrease rate. Therefore, when the braking operation is released, the braking forces can be smoothly released.

According to this embodiment, when the second ECU 32 cannot transmit information to the first ECU 26, the electric booster 16 is normally operating, and the pressure in the master cylinder 8 is equal to or less than the predetermined value PM0, both the electric booster 16 and the hydraulic supply device 30 increase the pressure inside the wheel cylinders 41, 4R, 5L, and 5R. In this case, Pw0, which is the maximum wheel cylinder pressure, can be set to a small amount as input for generating the braking force. Therefore, even when the driver feels a sense of discomfort in the braking operation, in consideration of the state in which the alarm indicating the communication abnormality is notified (reported) to the driver, it is considered that a sense of discomfort can be reduced to a satisfactory amount.

Figure 9:
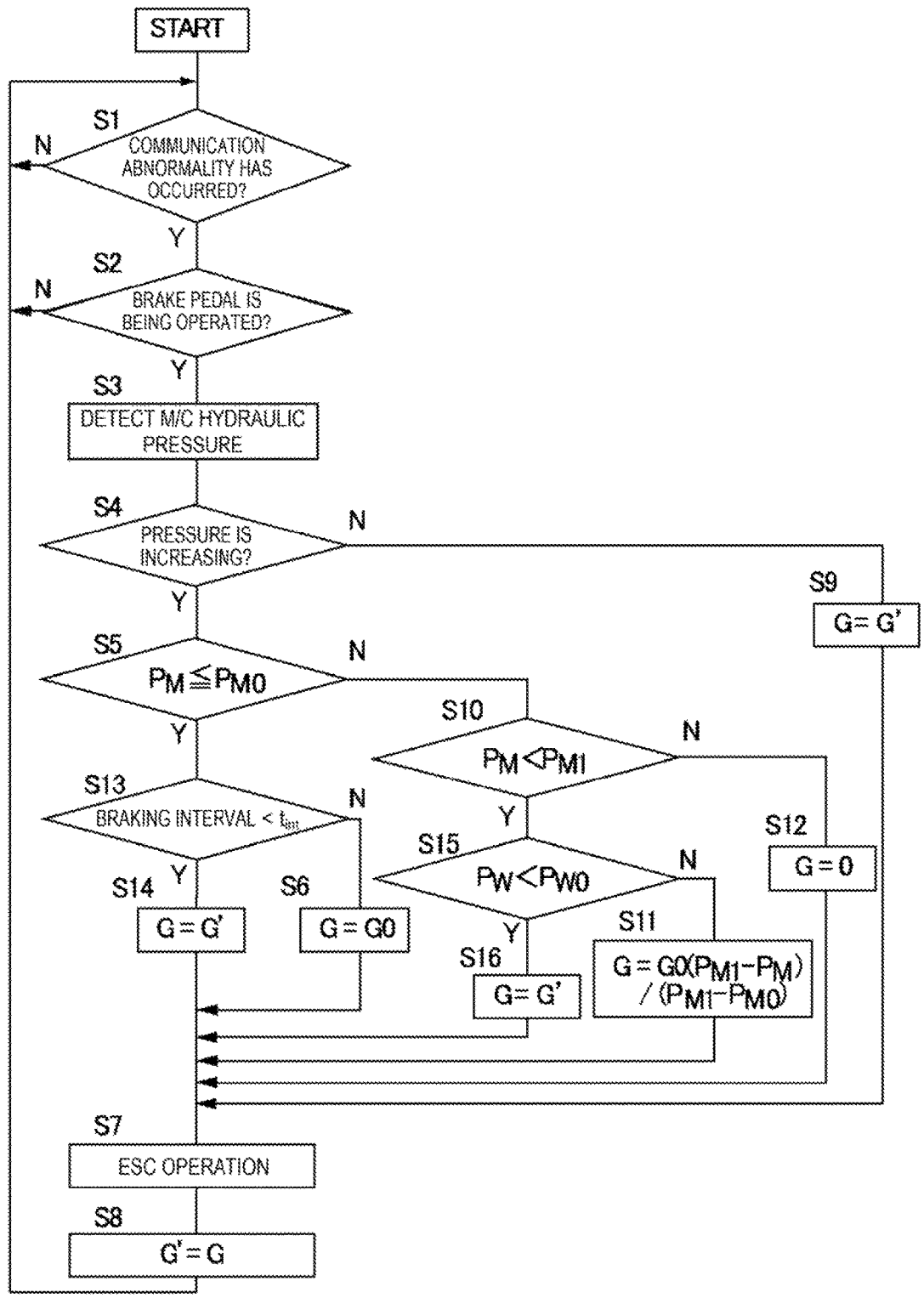
FIG. 9 is a flowchart for illustrating control processing according to a second embodiment of the present invention.

Referring to FIG. 9, a description is now given of a second embodiment of the present invention. FIG. 9 is a flowchart for illustrating the second embodiment. A feature of the second embodiment resides in that the motion (control gain G) of the hydraulic pressure control mechanism during the previous braking operation is taken over during the braking operation. According to the second embodiment, like components are denoted by like numerals as in the first embodiment, and a description thereof is omitted.

A description has been given of the first embodiment while focusing on the braking operation carried out once when the information cannot be transmitted between the first ECU 20 and the second ECU 30. In contrast, in the second embodiment, a case in which a plurality of times of the braking operation are carried out is considered. For example, when the driver carries out the braking operation at a short interval Tint, the states of the brake system (the electric booster 16 and the hydraulic pressure supply device 30) are unlikely to change during this period. Thus, when the master cylinder pressure PM measured during the previous braking exceeds, for example, the predetermined value PM0 serving as the value for determining whether or not the electric booster 16 has failed, the electric booster 16 is highly likely to be capable of operating.

Thus, the second embodiment is configured so that the brake assist function during the occurrence of the communication abnormality is maintained by having the next braking during a force increase (during the braking operation) take over the value of the control gain G stored during a force decrease (during the release of the braking operation) in the previous braking. In other words, the second ECU 32 controls the pressurization amount in the wheel cylinders 4L, 4R, 5L, and 5R during the braking operation after the braking operation while the pressure PM in the master cylinder 8 exceeds the predetermined value PM0 so as to attain the same increase rate as the decrease rate of the pressure: inside the wheel cylinders 4L, 4R, 5L, and 5R in the previous release of the operation.

FIG. 9 is a flowchart for illustrating the control processing according to the second embodiment. Processing of S1 to S12 of FIG. 9 is the same as the processing of S1 to S12 of FIG. 5 according to the first embodiment. According to the second embodiment, when the determination "YES" is made in S5, that is, the master cylinder pressure PM is determined to be equal to or less than the predetermined value PM0 (PM≥PM0), the second ECU 32 proceeds to S13. In S13, the second ECU 33 determines whether or not an elapsed period (brake interval) from the completion of the previous braking to the start of the current braking is less than Tint.

When a determination "YES" is made in S13, that is, the braking interval is determined to be less than Tint (braking interval<Tint), the second ECU 32 proceeds to S14. In S14, the second ECU 32 sets the control gain G to the current control gain stored value G' (=control gain G during the previous force decrease), and proceeds to S7. On the other hand, when a determination "NO" is made in S13, that is, the braking interval is determined to be equal to or more than Tint (braking interval≥Tint), the second ECU 32 proceeds to S6.

As a rough estimate of the braking interval Tint in S13, the braking interval Tint can be set to, for example, a short period so that the driver may recognize that the abnormality (communication abnormality) has occurred, to the vehicle. Moreover, the braking interval is not limited to the period, and can be set so that the determination "YES" is made in S13 (so as to proceed to S14) until the number of times of braking reaches a predetermined number of times. Moreover, for example, the determination "YES" may be made in S13 (the second ECU 32 may proceed co S14) until the vehicle signal (IGN) turns OFF.

Moreover, according to the second embodiment, S15 is added after S10. In S15, whether or not the target wheel cylinder pressure Pw is less than the maximum wheel cylinder pressure Pw0 is determined. Then, when a determination "YES" is made in S15, that is, the target wheel, cylinder pressure Pw is less than the maximum wheel cylinder pressure Pw0, the second ECU 32 proceeds to S16, sets the control gain G to the current control gain stored value G', and proceeds to S7. On the other hand, when a determination "NO" is made in S15, that is, the target wheel cylinder pressure Pw is equal to or more than the maximum wheel cylinder pressure Pw0, the second ECU 32 proceeds to S11.

When the determination of S15 is not made, the control gain is set to the control gain G during the previous force decrease as a result of the determination of S13. For example, when the characteristic is represented as the dotted line 0-B of FIG. 6, and the control gain G is calculated in S11 only in accordance with the determination of S10, the control gain G is calculated, as the initial set value G0 when the master cylinder pressure PM becomes the predetermined value PM0, and thus the target wheel cylinder pressure Pw is set to the maximum wheel cylinder pressure Pw0, and the characteristic moves to the point A of FIG. 6. As a result, even when the master cylinder pressure PM becomes the predetermined value PM0 as a result of the determination of S15, the control gain G is set to the current control gain stored value G' in S16, the characteristic represented as the 0-B dotted line of FIG. 6 is maintained, and the characteristic represented by the B-C line is attained by the calculation of the control gain G in S11 after the point B is reached.

The second embodiment carries out the backup control described above, and thus a basic action is not particularly different from that of the first embodiment.

In particular, according to the second embodiment, when the elapsed period (braking interval) from the completion of the previous braking to the start of the current braking is less than Tint, the second ECU 32 carries out the boosting by the hydraulic pressure supply device 30 at the control gain G' during the previous control release (control gain G' in S9=control gain G' stored in S8 of the last control cycle during the previous pressure increase). In this case, for example, when the control gain G' at the previous control release is aero (G'=0), the boosting is carried out while the control gain G is 0 (that is, the pressurization by the hydraulic pressure supply device 30 is 0.

According to the second embodiment, the second ECU 32 controls the pressurization amount inside the wheel cylinders 4L, 4R, 5L, and 5R in this way so as to attain the same increase race as the decrease race during the braking operation after the braking operation while the pressure in the master cylinder 8 exceeds the predetermined value PM0 in the previous braking. Therefore, when the driver operates the brake pedal 6 a plurality of times under the state of the communication abnormality where information cannot be transmitted between the first ECU 26 and the second ECU 32, the change in the brake feeling occurring immediately after the communication abnormality occurs can be alleviated while the required boosting by the hydraulic pressure supply device 30 is continued.

In the first embodiment described above, a description has been given of, as an example, the case where the predetermined value PM0 used to decrease the pressurization amount is set as the pressure value that can be supplied from the master cylinder 8 under the state in which the electric booster 16 is not operating. However, the setting of the predetermined value PM0 is not limited to this case, and, for example, the predetermined value may be set as a pressure increase rate that can be supplied from the master cylinder under the state in which the boost mechanism is not operating. This point is the same also in the second embodiment.

In the first embodiment described above, a description has been given of, as an example, the case where the communication line connecting the first ECU 26 and the second ECU 32 to each other is the signal line 27 for directly connecting only between the first ECU 26 and the second ECU 32. However, the communication line is not limited to this case, and the communication line may be both the signal line 27 connecting only the first ECU 26 and the second ECU 32 to each other, and the vehicle data bus 28 for connecting a plurality of controllers for the vehicle to one another. This point is the same also in the second embodiment.

In the first embodiment described above, a description has been given of, as an example, the case where the pressure (PM0) in the master cylinder is used as the determination value for decreasing the pressurization amount. However, the determination value is not limited to this case, and another value (state amount) relating to the pressure in the master cylinder, namely, a value based on the pressure in the master cylinder may be used as the determination value for decreasing the pressurization amount. This point is the same also in the second embodiment.

According to the first and second embodiments, it is possible to prevent the braking forces from being excessive when the transmission of information between the first control unit and the second control unit becomes impossible.

In other words, according to the first and second embodiments, when the transmission of information between the first control unit and the second control unit becomes impossible, the second control unit uses the backup control mechanism to carry out the backup control. When the boost mechanism is normally operating during the backup control, both the boost mechanists and the hydraulic pressure control mechanism pressurize the insides of the wheel cylinders. On this occasion, when the value based on the pressure in the master cylinder exceeds the predetermined value, the hydraulic pressure control mechanism, decreases the pressurization amount of the pressure inside the wheel cylinders. Therefore, it is possible to prevent the braking forces from being excessive based on the decrease in the pressurization amount caused by the hydraulic pressure control mechanism even when both of the boost mechanism and the hydraulic pressure control mechanism, increase the pressure inside the wheel cylinders.

Meanwhile, when the transmission of information between the first control unit and the second control unit becomes impossible, and the boost mechanism cannot increase the pressure inside, the wheel cylinders, the hydraulic pressure control mechanism pressurizes the insides of the wheel cylinders. On this occasion, the hydraulic pressure control mechanism does not decrease the pressurization amount until the value based on the pressure in the master cylinder becomes the predetermined value. In other words, the hydraulic pressure control mechanism may increase the pressurization amount until the value based on the pressure in the master cylinder becomes the predetermined value. As a result, even when the transmission of information between the first control unit and the second control unit becomes impossible, and the boost mechanism cannot increase the pressure inside the wheel cylinders, required braking forces can be secured.

According to the first and second embodiments, the predetermined value is set to the pressure value that can be supplied from the master cylinder while the boost mechanism is not operating. In this case, when the boost mechanism is normally operating, and the pressure value in the master cylinder exceeds the predetermined value, the pressurization amount of the hydraulic pressure control mechanism decreases. As a result, it is possible to prevent the braking forces from being excessive. Meanwhile, when the boost mechanism cannot increase the pressure inside the wheel cylinders, the pressurization amount of the hydraulic pressure control mechanism can be increased until the pressure value inside the master cylinder becomes the predetermined value. As a result, even when the boost mechanism cannot increase the pressure inside the wheel cylinders, required braking forces can be secured.

According to the first and second embodiments, the predetermined value is set to the pressure increase rate that can be supplied from the master cylinder while the boost mechanism is not operating. In this case, when the boost mechanism is normally operating, and the pressure increase rate in the master cylinder exceeds the predetermined value, the pressurization amount of the hydraulic pressure control mechanism decreases. As a result, it is possible to prevent the braking forces from being excessive. Meanwhile, when the boost mechanism cannot, increase the pressure inside the wheel cylinders, the pressurization amount of the hydraulic pressure control mechanism can be increased until the pressure increase rate of the master cylinder becomes the predetermined value. As a result, even when the boost mechanism cannot increase the pressure inside the wheel cylinders, required braking forces can be secured.

According to the first and second embodiments, the second control unit is configured to decrease the pressure inside the wheel cylinders in accordance with the pressure in the master cylinder when the operation is released during the braking operation while the value based on the pressure inside the master cylinder exceeds the predetermined value, and store the decrease rate. Therefore, when the braking operation is released, the braking forces can be smoothly released.

According to the first and second embodiments, the second control unit is configured to control the pressurization amount inside the wheel cylinders so that the increase rate is the same as the decrease rate during the braking operation after the braking operation while the value based or the pressure inside the master cylinder exceeds the predetermined value. In this case, during the braking operation, the operation of the hydraulic pressure control mechanism during the previous braking operation can be taken over. As a result, the change in the brake feeling caused by the pressurization (backup control) by the hydraulic pressure control mechanism can be alleviated.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended co be included in the technical scope of the present invention. The above-mentioned embodiments may be arbitrarily combined.

The present application claims priority based on Japanese Patent Application No. 2015-039473 filed on Feb. 27, 2015. The entire disclosure including Specification, Scope of Claims, Drawings, and Abstract of Japanese Patent Application No. 2015-039473 filed on Feb. 27, 2015 is incorporated herein by reference in their entirety.

REFERENCE SIGNS LIST 4L, 4R, 5L, 5R wheel cylinder
7 operation amount detector (stroke sensor)
8 master cylinder
16 electric booster (boost mechanism)
26 first ECU (first control unit)
27 signal line (communication line)
25 hydraulic pressure sensor (master cylinder pressure sensor)
30 hydraulic pressure supply device (hydraulic pressure control mechanism)
32 second ECU (second control unit)
44, 44' hydraulic pump (hydraulic pressure source)

The invention claimed is:

1. A brake control device, comprising:
a master cylinder to be operated by a braking operation of a driver;
a boost mechanism capable of increasing a pressure inside a wheel cylinder by operating the master cylinder in accordance with a braking operation amount of the driver;
a first control unit configured to control operation of the boost mechanism so as to pressurize the master cylinder in accordance with a detection value of a stroke sensor configured to detect the braking operation amount of the driver;
a master cylinder pressure sensor configured to detect a pressure of the master cylinder;
a hydraulic pressure control mechanism provided independently of the boost mechanism and comprising a hydraulic pressure source capable of increasing the pressure inside the wheel cylinder;
a second control unit to which the master cylinder pressure sensor is connected, and which is configured to control operation of the hydraulic pressure control mechanism; and
a communication line configured to connect the first control unit and the second control unit to each other for bi-directional transmission of information, wherein:
the second control unit comprises a backup control mechanism configured to detect, when the second control unit is incapable of transmitting the information to the first control unit, the braking operation amount of the driver based on signal input from the master cylinder pressure sensor, and to operate the hydraulic pressure control mechanism based on the detected braking operation amount, to thereby pressurize the inside of the wheel cylinder; and
the second control unit is configured to decrease a pressurization amount of the pressure inside the wheel cylinder when a value based on the pressure of the master cylinder exceeds a predetermined value during backup control by the backup control mechanism.

2. A brake control device according to claim 1, wherein the predetermined value is set as a pressure value capable of being supplied from the master cylinder under a state in which the boost mechanism is not operating.

3. A brake control device according to claim 2, wherein the second control unit is configured to decrease the pressure inside the wheel cylinder in accordance with the pressure of the master cylinder at a time when a braking operation is released during the braking operation while the value based on the pressure inside the master cylinder exceeds the predetermined value, and to store a decrease rate of the pressure.

4. A brake control device according to claim 3, wherein the second control unit is configured to control the pressurization amount inside the wheel cylinder so that an increase rate of the pressure is the same as the decrease rate during a braking operation after the braking operation while the value based on the pressure of the master cylinder exceeds the predetermined value.

5. A brake control device according to claim 1, wherein the predetermined value is set as a pressure increase rate capable of being supplied from the master cylinder under a state in which the boost mechanism is not operating.

6. A brake control device according to claim 3, wherein the second control unit is configured to decrease the pressure inside the wheel cylinder in accordance with the pressure of the master cylinder at a time when a braking operation is released during the braking operation while the value based on the pressure inside the master cylinder exceeds the predetermined value, and to store a decrease rate of the pressure.

7. A brake control device according to claim 6, wherein the second control unit is configured to control the pressurization amount inside the wheel cylinder so that an increase rate of the pressure is the same as the decrease rate during a braking operation after the braking operation while the value based on the pressure of the master cylinder exceeds the predetermined value.

8. A brake control device according to claim 1, wherein the second control unit is configured to decrease the pressure inside the wheel cylinder in accordance with the pressure of the master cylinder at a time when a braking operation is released during the braking operation while the value based on the pressure inside the master cylinder exceeds the predetermined value, and to store a decrease rate of the pressure.

9. A brake control device according to claim 8, wherein the second control unit is configured to control the pressurization amount inside the wheel cylinder so that an increase rate of the pressure is the same as the decrease rate during a braking operation after the braking operation while the value based on the pressure of the master cylinder exceeds the predetermined value.

\* \* \* \* \*